US012618932B2

(12) United States Patent
Dong et al.

(10) Patent No.: US 12,618,932 B2
(45) Date of Patent: May 5, 2026

(54) METHOD FOR OBTAINING POSTURE INFORMATION AND ELECTRONIC DEVICE

(71) Applicant: Huawei Technologies Co., Ltd., Shenzhen (CN)

(72) Inventors: Wei Dong, Xi'an (CN); Haowei Xu, Xi'an (CN); Qingfeng Xue, Xi'an (CN); Erli Wang, Xi'an (CN)

(73) Assignee: HAUWEI TECHNOLOGIES CO., LTD., Shenzhen (CN)

( * ) Notice: Subject to any disclaimer, the term of this patent is extended or adjusted under 35 U.S.C. 154(b) by 291 days.

(21) Appl. No.: 18/263,625

(22) PCT Filed: Dec. 13, 2021

(86) PCT No.: PCT/CN2021/137535
§ 371 (c)(1),
(2) Date: Jul. 31, 2023

(87) PCT Pub. No.: WO2022/160978
PCT Pub. Date: Aug. 4, 2022

(65) Prior Publication Data
US 2024/0319312 A1     Sep. 26, 2024

(30) Foreign Application Priority Data
Jan. 30, 2021     (CN) .......................... 202110131647.8

(51) Int. Cl.
*G01S 5/02* (2010.01)
*G01S 5/14* (2006.01)
(Continued)

(52) U.S. Cl.
CPC ............ *G01S 5/02213* (2020.05); *G01S 5/14* (2013.01); *G05B 19/4183* (2013.01); *G06F 3/0346* (2013.01); *G05B 2219/2642* (2013.01)

(58) Field of Classification Search
None
See application file for complete search history.

(56) References Cited

U.S. PATENT DOCUMENTS 6,441,779 B1    8/2002  Bennett et al.
9,520,051 B1 *  12/2016  Zack ................... G01S 13/0209
(Continued)

FOREIGN PATENT DOCUMENTS

CN          101387882 A      3/2009
CN          105892753 A      8/2016
(Continued)

OTHER PUBLICATIONS

Shi Yan et al, "Research on the Key Technology of Wireless/ GPS/ Inertial Integrated Seamless Positioning"; published in Modern Defence Technology; vol. 43, No. 4; Aug. 2015; pp. 86-92; published by China Academic Journal Electronic Publishing House. (Year: 2015).*
(Continued)

*Primary Examiner* — Bernarr E Gregory
(74) *Attorney, Agent, or Firm* — Conley Rose, P.C.

(57) ABSTRACT

The electronic device includes an ultra-wideband (UWB) chip and n antennas configured to construct a carrier antenna coordinate system, where n≥3. A coordinate origin of the carrier antenna coordinate system is located at a location of an antenna 0 in the n antennas, an antenna i is located on a coordinate axis of the carrier antenna coordinate system, and a distance between the antenna i and the antenna 0 is less than or equal to λ, where λ is a wavelength of a UWB signal, and a value of i is sequentially obtained in {1, 2, . . . , n−1}. The electronic device receives UWB signals from m UWB base stations by using the n antennas, where m≥3, and m is an integer. Spatial posture information of the electronic device is determined based on the received UWB signals.

20 Claims, 21 Drawing Sheets

(51) Int. Cl.
    *G05B 19/418*     (2006.01)
    *G06F 3/0346*     (2013.01)

(56)             References Cited

U.S. PATENT DOCUMENTS

| | | |
|---|---|---|
| 2013/0214975 A1 | 8/2013 | Smid |
| 2015/0172870 A1 | 6/2015 | Venkatesan |
| 2015/0192656 A1* | 7/2015 | Werner ..................... G01S 3/46 |
| | | 342/442 |
| 2015/0207920 A1 | 7/2015 | Choi et al. |
| 2016/0377704 A1* | 12/2016 | Harash ................ G01S 13/0209 |
| | | 342/21 |
| 2016/0377705 A1* | 12/2016 | Zack ................... G01S 13/0209 |
| | | 342/21 |
| 2016/0379282 A1 | 12/2016 | Hill et al. |
| 2016/0379475 A1* | 12/2016 | Zack ................... G01S 13/0209 |
| | | 342/21 |
| 2017/0104932 A1 | 4/2017 | Jiang et al. |
| 2017/0105046 A1 | 4/2017 | Shin |
| 2018/0213492 A1 | 7/2018 | Xia |
| 2021/0286038 A1 | 9/2021 | Ren et al. |

FOREIGN PATENT DOCUMENTS

| | | | |
|---|---|---|---|
| CN | 106680763 | A | 5/2017 |
| CN | 108012325 | A | 5/2018 |
| CN | 108362262 | A | 8/2018 |
| CN | 109870984 | A | 6/2019 |
| CN | 110568767 | A | 12/2019 |
| CN | 110673091 | A | 1/2020 |
| CN | 110673101 | A | 1/2020 |
| CN | 111026314 | A | 4/2020 |
| CN | 111132013 | A | 5/2020 |
| CN | 111212182 | A | 5/2020 |
| CN | 112153721 | A | 12/2020 |
| CN | 112261669 | A | 1/2021 |
| EP | 2784533 | A1 | 10/2014 |
| WO | 2013075520 | A1 | 5/2013 |
| WO | 2020214758 | A1 | 10/2020 |

OTHER PUBLICATIONS

Shi Yan et al., Research on the Key Technology of Wireless / GPS / Inertial Integrated Seamless Positioning, Mode N Defence Technology, Aug. 2015, with an English abstract total 7 pags.

* cited by examiner

XOY is equivalent to a horizontal plane     $\varphi$ : Pitch angle
$Oy_B'$ is vertical projection of the $y_B$ axis     $\phi$ : Azimuth
on the XOY plane $y_BOZ$ is equivalent to a vertical surface     $\theta$: Roll angle $Oz_B'$ is vertical projection of the $z_B$ axis on the $y_BOZ$ plane

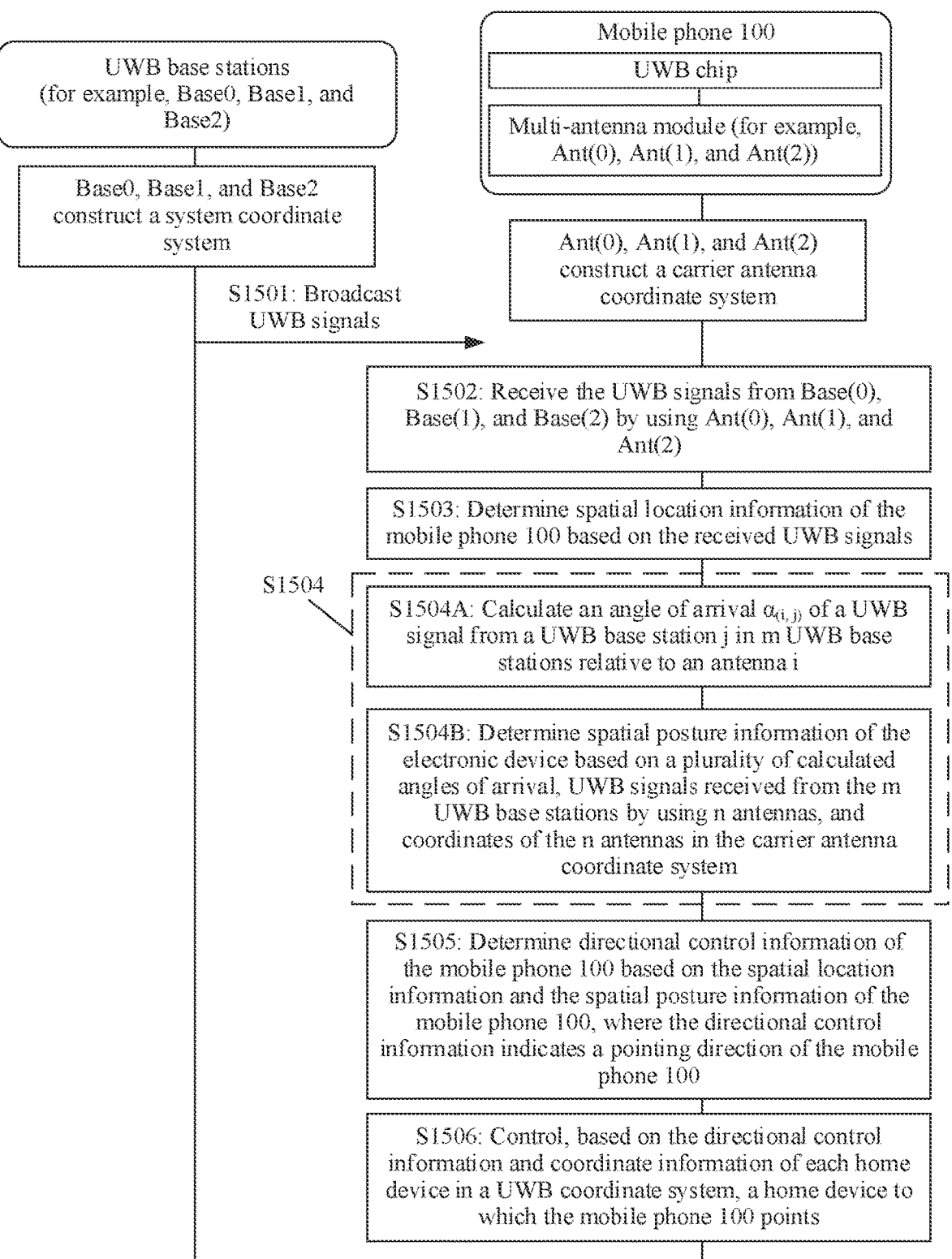

UWB base stations
(for example, Base0, Base1, and Base2)

Base0, Base1, and Base2 construct a system coordinate system

Mobile phone 100

UWB chip

Multi-antenna module (for example, Ant(0), Ant(1), and Ant(2))

Ant(0), Ant(1), and Ant(2) construct a carrier antenna coordinate system

S1501: Broadcast UWB signals

S1502: Receive the UWB signals from Base(0), Base(1), and Base(2) by using Ant(0), Ant(1), and Ant(2)

S1503: Determine spatial location information of the mobile phone 100 based on the received UWB signals

S1504

S1504A: Calculate an angle of arrival $\alpha_{(i,j)}$ of a UWB signal from a UWB base station j in m UWB base stations relative to an antenna i S1504B: Determine spatial posture information of the electronic device based on a plurality of calculated angles of arrival, UWB signals received from the m UWB base stations by using n antennas, and coordinates of the n antennas in the carrier antenna coordinate system S1505: Determine directional control information of the mobile phone 100 based on the spatial location information and the spatial posture information of the mobile phone 100, where the directional control information indicates a pointing direction of the mobile phone 100

S1506: Control, based on the directional control information and coordinate information of each home device in a UWB coordinate system, a home device to which the mobile phone 100 points

FIG. 15B

CONT.
FROM
FIG. 17A

CONT.
FROM
FIG. 17A

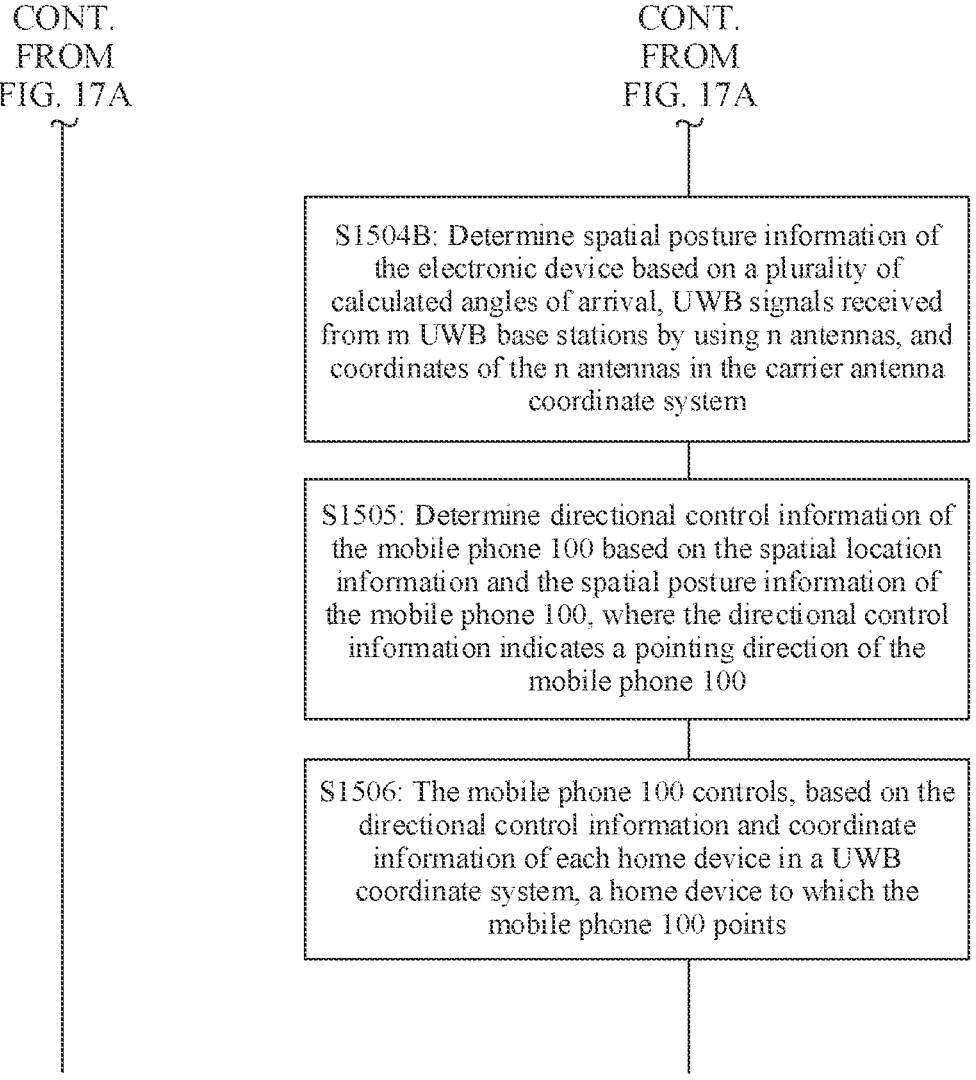

S1504B: Determine spatial posture information of the electronic device based on a plurality of calculated angles of arrival, UWB signals received from m UWB base stations by using n antennas, and coordinates of the n antennas in the carrier antenna coordinate system S1505: Determine directional control information of the mobile phone 100 based on the spatial location information and the spatial posture information of the mobile phone 100, where the directional control information indicates a pointing direction of the mobile phone 100

S1506: The mobile phone 100 controls, based on the directional control information and coordinate information of each home device in a UWB coordinate system, a home device to which the mobile phone 100 points

FIG. 17B

METHOD FOR OBTAINING POSTURE INFORMATION AND ELECTRONIC DEVICE

CROSS-REFERENCE TO RELATED APPLICATIONS

This is a National Stage of International Patent Application No. PCT/CN2021/137535 filed on Dec. 13, 2021, which claims priority to Chinese Patent Application No. 202110131647.8 filed on Jan. 30, 2021. Both of the aforementioned applications are hereby incorporated by reference in their entireties.

TECHNICAL FIELD

Embodiments of this application relate to the smart home field, and in particular, to a method for obtaining posture information and an electronic device.

BACKGROUND

With development of science and technology, the smart home has gradually entered people's daily life. The smart home may use a house as a platform to integrate home devices (such as a smart television and a smart air conditioner) related to home life for controlling over a wireless local area network such as a wireless fidelity (Wireless Fidelity. Wi-Fi) network, to improve home security, convenience, and comfort.

Specifically, a user may install a smart home application (Application, APP) on an electronic device (for example, a mobile phone or a tablet computer), to control a plurality of home devices. For example, in response to an operation performed by the user on an identifier of any home device (for example, a smart television, a smart air conditioner, or a smart socket) in the smart home APP, the mobile phone may display a control interface of the home device. Then, the mobile phone may control the home device in response to an operation performed by the user on the control interface displayed by the mobile phone.

However, because a quantity of home devices increases, a quantity of home devices that can be controlled by using the smart home APP also increases accordingly. To control the home devices more conveniently, currently, a function of displaying a control interface of a home device when the mobile phone points to the home device may be implemented by using an ultra-wideband (ultra-wideband, UWB) chip and an inertial measurement unit (inertial measurement unit. IMU) on the mobile phone.

To implement the foregoing function, a spatial posture of the mobile phone needs to be detected in real time. However, an error between the spatial posture of the mobile phone obtained through calculation by using the existing solution and an actual spatial posture of the mobile phone is relatively large. In other words, posture measurement accuracy of the mobile phone is relatively low. Consequently, an effect of directionally controlling the home device by the mobile phone is affected.

SUMMARY

This application provides a method for obtaining posture information and an electronic device, which can reduce an error between posture information obtained by the electronic device through calculation and actual posture information, improve posture measurement accuracy of the electronic device, and further improve an effect of directionally controlling a home device by the electronic device.

According to a first aspect, this application provides a method for obtaining posture information. The method may be applied to an electronic device, the electronic device includes a UWB chip and n antennas, and the UWB chip is electrically connected to the n antennas, where n≥3, and n is an integer. The n antennas are configured to construct a carrier antenna coordinate system, a coordinate origin of the carrier antenna coordinate system coincides with a location of an antenna 0 in the n antennas, an antenna i in the n antennas is located on a coordinate axis of the carrier antenna coordinate system, and a distance between the antenna i and the antenna 0 is less than or equal to $\lambda$, where a value of i is sequentially obtained in $\{1, 2, \ldots, n-1\}$.

In the method, the electronic device may receive UWB signals from m UWB base stations by using the n antennas, where the m UWB base stations are configured to construct a UWB coordinate system, m≥3, and m is an integer. Then, the electronic device may determine spatial posture information of the electronic device based on the UWB signals received from the m UWB base stations by using the n antennas. The spatial posture information of the electronic device includes: a pitch angle $\varphi$, an azimuth $\phi$, and a roll angle $\theta$ of the carrier antenna coordinate system relative to the UWB coordinate system.

In this application, the electronic device includes a multi-antenna module (namely, the n antennas). The electronic device may measure a UWB signal from each UWB base station by using the multi-antenna module, and then obtain the spatial posture information of the mobile phone 100 based on each UWB signal. Each UWB signal is obtained through real-time measurement by the electronic device by using the multi-antenna module. Therefore, accuracy of each UWB signal can be ensured. Therefore, an error between posture information obtained by the electronic device through calculation and actual posture information can be reduced, posture measurement accuracy of the electronic device can be improved, and then an effect of directionally controlling a home device by the electronic device can be improved.

In addition, in this solution, the spatial posture information is calculated by using the UWB signals that is received by the multi-antenna module in real time. The multi-antenna module of the electronic device may receive a UWB signal at each moment. Therefore, the spatial posture information is calculated by using this solution without depending on spatial posture information calculated at a previous moment. In addition, even if an error exists in the spatial posture information obtained through calculation, the error does not accumulate over time.

Further, in this solution, the spatial posture information of the electronic device is calculated without depending on a device like a magnetometer or a gyroscope in the electronic device. Therefore, the device like the magnetometer or the gyroscope in the electronic device does not need to be calibrated, and a user does not need to operate the electronic device in a specific manner, so that the spatial posture information of the electronic device 0 can be measured. In this way, user operations in a process of measuring posture information can be reduced.

With reference to the first aspect, in a possible design manner, the electronic device may perform the method in this application in the following scenario to obtain the spatial posture information of the electronic device, to implement directional control on the home device.

In a scenario, after the electronic device is powered on, the electronic device may receive the UWB signals from the m UWB base stations by using the n antennas to obtain the spatial posture information of the electronic device, to implement directional control on the home device.

In another scenario, after the electronic device starts a smart home application APP, the electronic device may receive the UWB signals from the m UWB base stations by using the n antennas to obtain the spatial posture information of the electronic device, to implement directional control on the home device.

In still another scenario, after the electronic device starts a preset function, the electronic device may receive the UWB signals from the m UWB base stations by using the n antennas to obtain the spatial posture information of the electronic device, to implement directional control on the home device.

At least one of a notification bar of the electronic device, a setting interface of the electronic device, or a setting interface of the smart home APP includes an on/off option of the preset function. The on/off option is used to enable or disable the preset function.

This design manner provides an example of a specific scenario in which the electronic device performs the method in this application. Certainly, scenarios in which the electronic device performs the method in this application include but are not limited to the foregoing scenario.

With reference to the first aspect, in another possible design manner, the electronic device may further determine spatial location information of the electronic device based on the UWB signals received from the m UWB base stations by using the n antennas. The spatial location information includes coordinate information of the electronic device in the UWB coordinate system. Then, the electronic device may determine directional control information of the electronic device based on the spatial location information and the spatial posture information. The directional control information indicates a pointing direction of the electronic device. Finally, the electronic device may control, based on the directional control information and the coordinate information of each home device in the UWB coordinate system a home device to which the electronic device points.

With reference to the first aspect, in another possible design manner, the distance between the antenna i and the antenna 0 is less than or equal to $\lambda/2$. It should be noted that the distance between the antenna i and the antenna 0 is set to be less than or equal to $\lambda/2\lambda/2$, so that an incident angle of an antenna is more accurately obtained, which helps improve posture measurement accuracy of the electronic device.

With reference to the first aspect, in another possible design, n=3 is used as an example. The n antennas may include the antenna 0, an antenna 1, and an antenna 2.

An x axis of the carrier antenna coordinate system of the electronic device is parallel to a connection line between the antenna 1 and the antenna 0, and points to a direction from the antenna 1 to the antenna 0. A y axis of the carrier antenna coordinate system is parallel to a connection line between the antenna 2 and the antenna 0, and points to a direction from the antenna 2 to the antenna 0. A z axis of the carrier antenna coordinate system is perpendicular to the x axis and the y axis, and the z axis, the x axis, and the y axis form a right-hand rectangular coordinate system.

This design manner provides an example of location setting of the n antennas in the electronic device and an example of the carrier antenna coordinate system in this application. Certainly, the location setting of the n antennas in the electronic device in this application includes but is not limited to the foregoing location setting manner. The carrier antenna coordinate system in this application includes but is not limited to the carrier antenna coordinate system in the foregoing example.

With reference to the first aspect, in another possible design manner, the electronic device may receive the UWB signals from the m UWB base stations by using the n antennas in the following manner. Specifically, the electronic device may determine an angle of arrival $\alpha_{(i, j)}$ of a UWB signal from a UWB base station j in the m UWB base stations relative to an antenna i, where a value of j is sequentially obtained in $\{0, 1, 2, \ldots, m-1\}$, and the angle of arrival $\alpha_{(i, j)}$ is an included angle between a vector from the antenna i to the UWB base station j and a vector from the antenna i to the antenna 0 in the UWB coordinate system. Then, the electronic device may determine the spatial posture information of the electronic device based on a plurality of angles of arrival, the UWB signals received from the m UWB base stations by using the n antennas, and coordinates of the n antennas in the carrier antenna coordinate system, where the plurality of angles of arrival include the angle of arrival $\alpha_{(i, j)}$ obtained when a value of i is sequentially obtained in $\{1, 2, \ldots, n-1\}$ and a value of j is sequentially obtained in $\{0, 1, 2, \ldots, m-1\}$.

In this application, the electronic device may measure a direction of arrival of a UWB signal from each UWB base station by using the multi-antenna module, and then obtain the spatial posture information of the mobile phone 100 based on the direction of arrival of each UWB signal. The direction of arrival of each UWB signal is obtained through real-time measurement by the electronic device by using the multi-antenna module, and therefore, accuracy of the direction of arrival of each UWB signal can be ensured. Therefore, an error between posture information obtained by the electronic device through calculation and actual posture information can be reduced, posture measurement accuracy of the electronic device can be improved, and then an effect of directionally controlling a home device by the electronic device can be improved.

With reference to the first aspect, in another possible design manner, that the electronic device determines an angle of arrival $\alpha_{(i, j)}$ of a UWB signal from a UWB base station j in the m UWB base stations relative to the antenna i may include: The electronic device obtains a phase difference between UWB signals received from the UWB base station j by using the antenna i and the antenna 0, where the phase difference indicates a distance difference between a distance between the antenna i and the UWB base station j and a distance between the antenna 0 and the UWB base station j; and the electronic device calculates the angle of arrival $\alpha_{(i, j)}$ by using the law of cosines based on the distance difference indicated by the phase difference and the distance between the antenna i and the antenna 0. This design manner provides a specific manner of calculating the angle of arrival $\alpha_{(i, j)}$ by the electronic device in this application.

With reference to the first aspect, in another possible design manner, the electronic device may determine the spatial posture information of the electronic device based on a plurality of angles of arrival, the UWB signals received from the m UWB base stations by using the n antennas, and coordinates of the n antennas in the carrier antenna coordinate system in the following manner. Specifically, the electronic device may obtain a baseline vector $r_{(i, j)}$ based on the UWB signal received from the UWB base station j by using the antenna i. Then, the electronic device may obtain a first unit baseline vector $rq_i$ based on coordinates of the antenna i in the carrier antenna coordinate system. Finally, the electronic device may determine the spatial posture information of the electronic device based on the plurality of angles of arrival, a plurality of baseline vectors, and a plurality of first unit baseline vectors.

The plurality of baseline vectors include the first baseline vector $r_{(i,\ j)}$ obtained when a value of i is sequentially obtained in $\{1, 2, \ldots, n-1\}$ and a value of j is sequentially obtained in $\{0, 1, 2, \ldots, m-1\}$; and the plurality of first unit baseline vectors include the first unit baseline vector $rq_i$ obtained when a value of i is sequentially obtained in $\{1, 2, \ldots, n-1\}$ and a value of j is sequentially obtained in $\{0, 1, 2, \ldots, m-1\}$.

It should be understood that the baseline vector $r_{(i,\ j)}$ is a direction vector from the antenna i to the UWB base station j in the UWB coordinate system. The angle of arrival $\alpha_{(i,\ j)}$ is the included angle between the vector from the antenna i to the UWB base station j and the vector from the antenna i to the antenna 0 in the UWB coordinate system. The first unit baseline vector $rq_i$ is a unit direction vector from the antenna i to the antenna 0 in the carrier antenna coordinate system. Therefore, the electronic device may determine the spatial posture information of the electronic device according to a coordinate conversion principle and based on the plurality of angles of arrival, the plurality of baseline vectors, and the plurality of first unit baseline vectors.

With reference to the first aspect, in another possible design manner, that the electronic device determines the spatial posture information of the electronic device based on the plurality of angles of arrival, a plurality of baseline vectors, and a plurality of first unit baseline vectors includes: The electronic device determines a plurality of second unit baseline vectors based on the plurality of angles of arrival and the plurality of baseline vectors; and the electronic device determines the spatial posture information of the electronic device based on the plurality of first unit baseline vectors and the plurality of second unit baseline vectors. The plurality of second unit baseline vectors include a second unit baseline vector $ra_{(i)}$ obtained when a value of i is sequentially obtained in $\{1, 2, \ldots, n-1\}$ and a value of j is sequentially obtained in $\{0, 1, 2, \ldots, m-1\}$, where the second unit baseline vector $ra_{(i)}$ is a unit direction vector from the antenna i to the antenna 0 in the UWB coordinate system.

It should be understood that the second unit baseline vector $ra_{(i)}$ is a unit direction vector from the antenna i to the antenna 0 in the UWB coordinate system. The first unit baseline vector $rq_i$ is the unit direction vector from the antenna i to the antenna 0 in the carrier antenna coordinate system. Therefore, the electronic device may determine the spatial posture information of the electronic device according to the coordinate conversion principle and based on the plurality of first unit baseline vectors and the plurality of second unit baseline vectors.

With reference to the first aspect, in another possible design manner, that the electronic device determines the spatial posture information of the electronic device based on the plurality of first unit baseline vectors and the plurality of second unit baseline vectors includes: The electronic device determines the spatial posture information of the electronic device based on the plurality of first unit baseline vectors and the plurality of second unit baseline vectors by using a preset rotation matrix.

The preset rotation matrix is a rotation matrix obtained when the electronic device transforms from a spatial posture corresponding to the pitch angle $\varphi$, the azimuth $\phi$, and the roll angle $\theta$ to a preset initial posture. The preset initial posture is a posture of the electronic device that exists when three axes of the carrier antenna coordinate system are respectively parallel to three axes of the UWB coordinate system. The preset rotation matrix is used to convert a coordinate parameter in the carrier antenna coordinate system into a coordinate parameter in the UWB coordinate system, and the coordinate parameter includes a vector.

It can be learned from the definition of the preset rotation matrix that the electronic device may determine the spatial posture information of the electronic device by using the preset rotation matrix, according to the coordinate conversion principle and based on the unit baseline vector $rq_i$ and the unit baseline vector $ra_{(i)}$.

According to a second aspect, this application provides an electronic device. The electronic device includes a UWB chip and n antennas, the UWB chip is electrically connected to the n antennas, $n \geq 3$, and n is an integer. The n antennas are configured to construct a carrier antenna coordinate system, a coordinate origin of the carrier antenna coordinate system coincides with a location of an antenna 0 in the n antennas, and an antenna i in the n antennas is located on a coordinate axis of the carrier antenna coordinate system. A distance between the antenna i and the antenna 0 is less than or equal to $\lambda$, and a value of i is sequentially obtained in $\{1, 2, \ldots, n-1\}$.

The electronic device further includes a memory and one or more processors. The UWB chip, the n antennas, and the memory are coupled to the processor. The memory is configured to store computer program code, and the computer program code includes computer instructions.

When the computer instructions are executed by the electronic device, the electronic device is enabled to perform the following steps: receiving a UWB signal from a UWB base station j in m UWB base stations by using the n antennas, where a value of j is sequentially obtained in $\{0, 1, 2, \ldots, m-1\}$, the m UWB base stations are configured to construct a UWB coordinate system, $m \geq 3$, and m is an integer; and determining spatial posture information of the electronic device based on UWB signals received from the m UWB base stations by using the n antennas, where the spatial posture information of the electronic device includes: a pitch angle $\varphi$, an azimuth $\phi$, and a roll angle $\theta$ of the carrier antenna coordinate system relative to the UWB coordinate system.

With reference to the second aspect, in a possible design manner, when the computer instructions are executed by the electronic device, the electronic device is enabled to further perform the following step: after the electronic device is powered on, or after the electronic device starts a smart home application APP, or after the electronic device starts a preset function, receiving the UWB signals from the m UWB base stations by using the n antennas.

At least one of a notification bar of the electronic device, a setting interface of the electronic device, or a setting interface of the smart home APP includes an on/off option of the preset function, where the on/off option is used to enable or disable the preset function.

With reference to the second aspect, in another possible design manner, when the computer instructions are executed by the electronic device, the electronic device is enabled to further perform the following steps: determining spatial location information of the electronic device based on the UWB signals received from the m UWB base stations by using the n antennas, where the spatial location information includes coordinate information of the electronic device in the UWB coordinate system; determining directional control information of the electronic device based on the spatial location information and the spatial posture information, where the directional control information indicates a pointing direction of the electronic device; and controlling, based on the directional control information and coordinate information of each home device in the UWB coordinate system, a home device to which the electronic device points.

With reference to the second aspect, in another possible design manner, the distance between the antenna i and the antenna 0 is equal to $\lambda/2$.

With reference to the second aspect, in another possible design manner, the n antennas include the antenna 0, an antenna 1, and an antenna 2, and n=3. An x axis of the carrier antenna coordinate system is parallel to a connection line between the antenna 1 and the antenna 0, and points to a direction from the antenna 1 to the antenna 0; a y axis of the carrier antenna coordinate system is parallel to a connection line between the antenna 2 and the antenna 0, and points to a direction from the antenna 2 to the antenna 0; and a z axis of the carrier antenna coordinate system is perpendicular to the x axis and the y axis, and the z axis, the x axis, and the y axis form a right-hand rectangular coordinate system.

With reference to the second aspect, in another possible design manner, when the computer instructions are executed by the electronic device, the electronic device is enabled to further perform the following steps: determining an angle of arrival $\alpha_{(i,\,j)}$ of the UWB signal from the UWB base station j in the m UWB base stations relative to the antenna i, where a value of j is sequentially obtained in $\{0, 1, 2, \ldots, m-1\}$, and the angle of arrival $\alpha_{(i,\,j)}$ is an included angle between a vector from the antenna i to the UWB base station j and a vector from the antenna i to the antenna 0 in the UWB coordinate system; and determining the spatial posture information of the electronic device based on a plurality of angles of arrival, the UWB signals received from the m UWB base stations by using the n antennas, and coordinates of the n antennas in the carrier antenna coordinate system, where the plurality of angles of arrival include the angle of arrival $\alpha_{(i,\,j)}$ obtained when a value of i is sequentially obtained in $\{1, 2, \ldots, n-1\}$ and a value of j is sequentially obtained in $\{0, 1, 2, \ldots, m-1\}$.

With reference to the second aspect, in another possible design manner, when the computer instructions are executed by the electronic device, the electronic device is enabled to further perform the following steps: obtaining a phase difference between UWB signals received from the UWB base station j by using the antenna i and the antenna 0, where the phase difference indicates a distance difference between a distance between the antenna i and the UWB base station j and a distance between the antenna 0 and the UWB base station j; and calculating, by the electronic device, the angle of arrival $\alpha_{(i,\,j)}$ by using the law of cosines based on the distance difference indicated by the phase difference and the distance between the antenna i and the antenna 0.

With reference to the second aspect, in another possible design manner, when the computer instructions are executed by the electronic device, the electronic device is enabled to further perform the following steps: obtaining a baseline vector $r_{(i,\,j)}$ based on the UWB signal received from the UWB base station j by using the antenna i, where the first baseline vector $r_{(i,\,j)}$ is a direction vector from the antenna i to the UWB base station j in the UWB coordinate system; obtaining a first unit baseline vector $rq_i$ based on coordinates of the antenna i in the carrier antenna coordinate system, where the first unit baseline vector $rq_i$ is a unit direction vector from the antenna i to the antenna 0 in the carrier antenna coordinate system; and determining the spatial posture information of the electronic device based on the plurality of angles of arrival, a plurality of baseline vectors, and a plurality of first unit baseline vectors.

The plurality of baseline vectors include the first baseline vector $r_{(i,\,j)}$ obtained when a value of i is sequentially obtained in $\{1, 2, \ldots, n-1\}$ and a value of j is sequentially obtained in $\{0, 1, 2, \ldots, m-1\}$; and the plurality of first unit baseline vectors include the first unit baseline vector $rq_i$ obtained when a value of i is sequentially obtained in $\{1, 2, \ldots, n-1\}$ and a value of j is sequentially obtained in $\{0, 1, 2, \ldots, m-1\}$.

With reference to the second aspect, in another possible design manner, when the computer instructions are executed by the electronic device, the electronic device is enabled to further perform the following steps: determining a plurality of second unit baseline vectors based on the plurality of angles of arrival and the plurality of baseline vectors, where the plurality of second unit baseline vectors include a second unit baseline vector $r_{(i,\,j)}$ obtained when a value of i is sequentially obtained in $\{1, 2, \ldots, n-1\}$ and a value of j is sequentially obtained in $\{0, 1, 2 \ldots, m-1\}$, and the second unit baseline vector $ra_{(i)}$ is a unit direction vector from the antenna i to the antenna 0 in the UWB coordinate system; and determining the spatial posture information of the electronic device based on the plurality of first unit baseline vectors and the plurality of second unit baseline vectors.

With reference to the second aspect, in another possible design, when the computer instructions are executed by the electronic device, the electronic device is enabled to further perform the following step: determining the spatial posture information of the electronic device based on the plurality of first unit baseline vectors and the plurality of second unit baseline vectors by using a preset rotation matrix, where the preset rotation matrix is a rotation matrix obtained when the electronic device transforms from a spatial posture corresponding to the pitch angle $\varphi$, the azimuth $\phi$, and the roll angle $\theta$ to a preset initial posture; the preset initial posture is a posture of the electronic device that exists when three axes of the carrier antenna coordinate system are respectively parallel to three axes of the UWB coordinate system; and the preset rotation matrix is used to convert a coordinate parameter in the carrier antenna coordinate system into a coordinate parameter in the UWB coordinate system, and the coordinate parameter includes a vector.

According to a third aspect, this application provides a chip system. The chip system is applied to an electronic device including a display, a memory and a communication module. The chip system integrates a function of a UWB chip. The chip system includes one or more interface circuits and one or more processors; the interface circuit and the processor are interconnected through a line; the interface circuit is configured to receive a signal from the memory of the electronic device, and send the signal to the processor, and the signal includes computer instructions stored in the memory, and when the processor executes the computer instructions, the electronic device performs the method according to any one of the first aspect and the possible design manners of the first aspect.

According to a fourth aspect, this application provides a computer storage medium. The computer storage medium includes computer instructions, and when the computer instructions are run on an electronic device, the electronic device is enabled to perform the method according to any one of the first aspect and the possible design manners of the first aspect.

According to a fifth aspect, this application provides a computer program product. When the computer program product runs on a computer, the computer is enabled to perform the method according to any one of the first aspect and the possible design manners of the first aspect.

It may be understood that for beneficial effects achievable by the electronic device according to the second aspect, the chip system according to the third aspect, the computer storage medium according to the fourth aspect, and the computer program product according to the fifth aspect, refer to the beneficial effects according to any one of the first aspect and the possible design manners of the first aspect. Details are not described herein again.

BRIEF DESCRIPTION OF DRAWINGS

FIG. 15B is a flowchart of a method for obtaining posture information according to an embodiment of this application;

FIG. 17A and FIG. 17B are a flowchart of another method for obtaining posture information according to an embodiment of this application;

DESCRIPTION OF EMBODIMENTS

The terms "first" and "second" mentioned below are merely intended for a purpose of description, and shall not be understood as an indication or implication of relative importance or implicit indication of the number of indicated technical features. Therefore, a feature limited by "first" or "second" may explicitly or implicitly include one or more features. In the descriptions of embodiments, unless otherwise specified, "a plurality of" means two or more than two.

Figure 1:
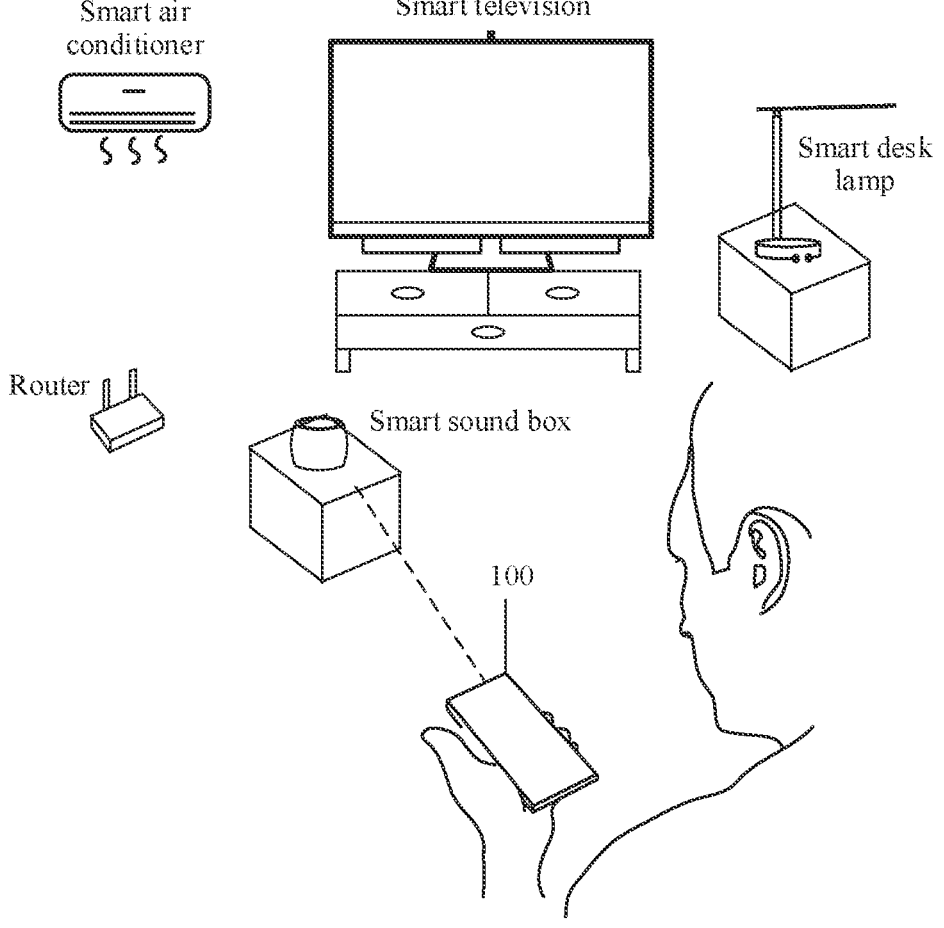
FIG. 1 is a schematic diagram of an application scenario of a method for obtaining posture information according to an embodiment of this application.
Figure 2:
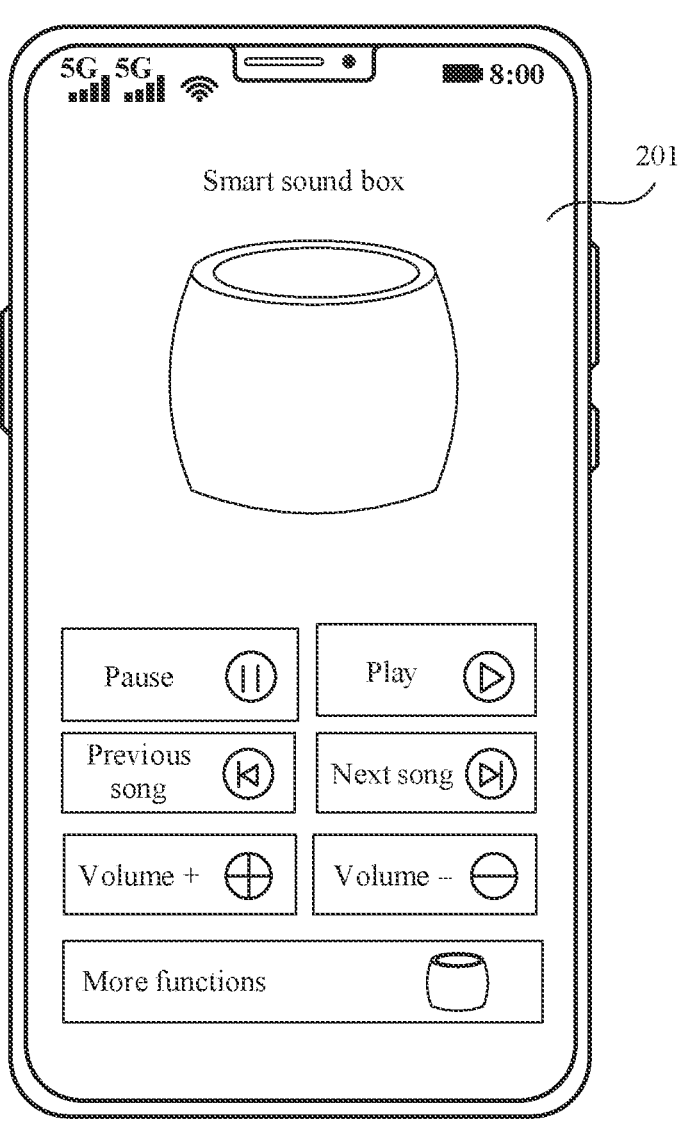
FIG. 2 is a schematic diagram of a control interface of a smart home according to an embodiment of this application.

Embodiments of this application provide a method for obtaining posture information. The method is used by an electronic device (for example, a mobile phone or a smart remote control) to directionally control a home device. FIG. 1 shows an electronic device 100 (for example, the mobile phone) as an example. That a user directionally controls the home device by using the mobile phone specifically means. When the user operates the mobile phone to point to a location of the home device (for example, a smart sound box shown in FIG. 1), the mobile phone may automatically display a control interface 201 that is of the smart sound box and that is shown in FIG. 2, so that the user operates the control interface to control the smart sound box.

Generally, the location of the home device is fixed. Therefore, the home device to which the electronic device points in a plurality of home devices may be determined based on placement locations (also referred to as spatial locations) of the plurality of home devices and a spatial posture of the electronic device.

The spatial posture of the electronic device 100 may reflect an orientation of the electronic device. It should be understood that an example in which the electronic device 100 is the mobile phone is used. Based on a habit of using the mobile phone by most users, an orientation of the mobile phone (or a pointing direction of the mobile phone) may be defined as a direction that is parallel to a long side of the mobile phone and that is from a tail to a top of the mobile phone. Therefore, the orientation of the mobile phone may be referred to as a top orientation of the mobile phone. Generally, the top of the mobile phone is a body portion on which hardware such as a front-facing camera, an infrared transmitter, a receiver, a light sensor, or a distance sensor is installed. The tail of the mobile phone is a body portion on which a microphone and a speaker are installed.

The spatial posture of the electronic device 100 may be indicated by spatial posture information of the electronic device 100. The spatial posture information of the electronic device 100 may include: a pitch angle (pitch) $\varphi$, an azimuth (yaw) $\phi$, and a roll angle (roll) $\theta$ of a carrier coordinate system of the electronic device 100 relative to a UWB coordinate system (also referred to as a fixed coordinate system) constructed by using ultra-wideband (ultra-wide-band, UWB) base stations. The azimuth may also be referred to as a yaw angle.

For ease of understanding, the following describes the carrier coordinate system of the electronic device 100, the UWB base station, the UWB coordinate system, and a pitch angle $\varphi$, an azimuth $\phi$, and a roll angle $\theta$ of the carrier coordinate system relative to the UWB coordinate system with reference to the accompanying drawings.

(1) Carrier Coordinate System of the Electronic Device 100

Figure 3:
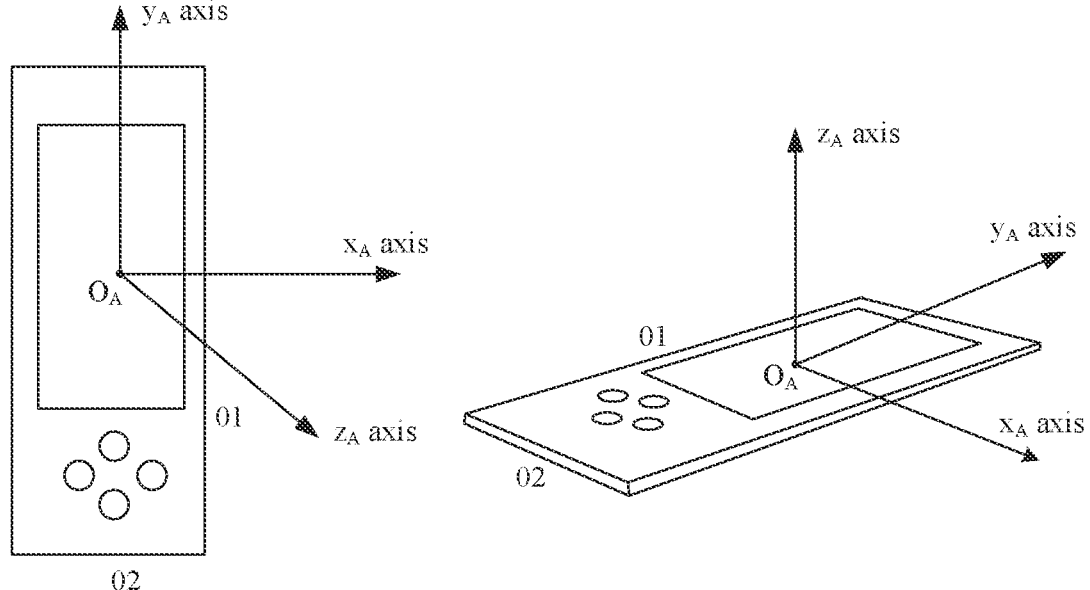
FIG. 3 is a schematic diagram of a carrier coordinate system of an electronic device (for example, a smart remote control) according to an embodiment of this application.

For example, the electronic device 100 is a smart remote control. FIG. 3 is a schematic diagram of an instance of a carrier coordinate system of a smart remote control. The carrier coordinate system of the smart remote control may be preconfigured in the smart remote control.

As shown in FIG. 3, an $x_A$ axis, a $y_A$ axis, and a $z_A$ axis that use $O_A$ as a coordinate origin form a right-hand rect-angular coordinate system. Herein, $O_A$ shown in FIG. 3 may be a center of gravity of the smart remote control, or $O_A$ shown in FIG. 3 may be a center of an IMU of the smart remote control. Generally, the IMU of the smart remote control may be disposed at the center of gravity of the smart remote control. The smart remote control may include four sides: a long side 01, a short side 02, the other long side that is parallel to the long side 01 and that is equal to the long side 01 in length, and the other short side that is parallel to the short side 02 and that is equal to the short side 02 in length. The $x_A$ axis is parallel to the short side 02 of the smart remote control. The $y_A$ axis is parallel to the long side 01 of the smart remote control and is upward. The $z_A$ axis is perpendicular to the $y_A$ axis, and is perpendicular to the $x_B$ axis. The coordinate system shown in FIG. 3 is the carrier coordinate system of the smart remote control.

Figure 4:
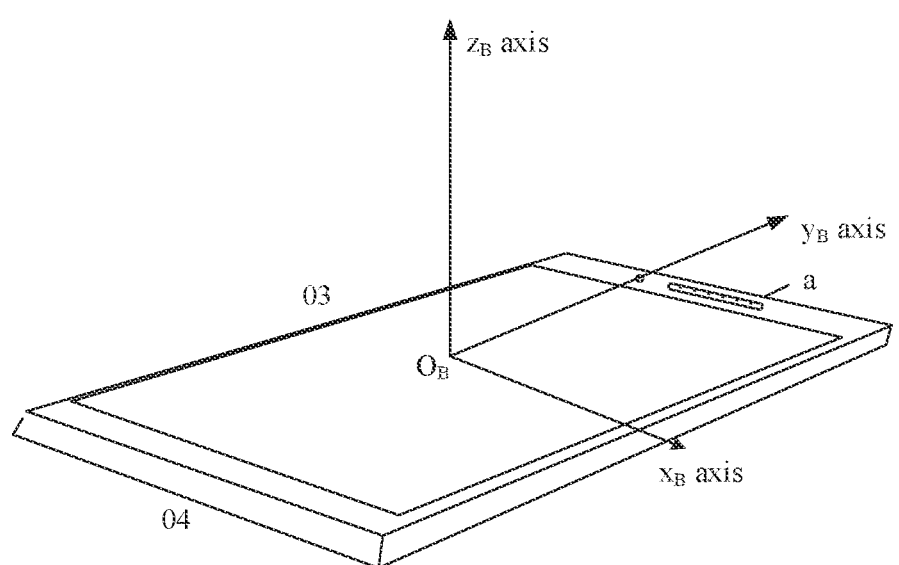
FIG. 4 is a schematic diagram of a carrier coordinate system of another electronic device (for example, a mobile phone) according to an embodiment of this application.

For another example, the electronic device 100 is a mobile phone. FIG. 4 is a schematic diagram of an instance of a carrier coordinate system of a mobile phone. The carrier coordinate system of the mobile phone may be preconfig-ured in the mobile phone.

As shown in FIG. 4, an $x_B$ axis, a $y_B$ axis, and a $z_B$ axis that use $O_B$ as a coordinate origin form a right-hand rect-angular coordinate system. Herein, $O_B$ shown in FIG. 4 may be a center of gravity of the mobile phone, or $O_B$ shown in FIG. 4 may be a center of an IMU of the mobile phone. Generally, the IMU of the mobile phone may be disposed at the center of gravity of the mobile phone. The mobile phone may include four sides: a long side 03, a short side 04, the other long side that is parallel to the long side 03 and that is equal to the long side 03 in length, and the other short side that is parallel to the short side 04 and that is equal to the short side 04 in length. The $x_B$ axis is parallel to the short side 04 of the mobile phone. The $y_B$ axis is parallel to the long side 01 of the mobile phone and is upward. The $z_B$ axis is perpendicular to the $y_A$ axis, and is perpendicular to the $x_B$ axis. The coordinate system shown in FIG. 4 is the carrier coordinate system of the mobile phone.

(2) UWB Base Station

The UWB base station may be an apparatus on which a UWB chip is installed, or a home device on which a UWB chip is installed. For example, some home devices in the communication system shown in FIG. 1 may serve as UWB base stations. The UWB base stations are configured to assist the electronic device 100 in determining a home device to which the electronic device 100 points.

Some home devices may be equipped with one or more UWB chips. For example, the smart television shown in FIG. 1 may include three UWB chips. The three UWB chips may be respectively disposed on, for example, locations of Base(0), Base(1), and Base(2) shown in FIG. 5, on the smart television. For another example, the smart air conditioner shown in FIG. 1 may include one UWB chip. Certainly, some home devices are equipped with no UWB chip. This is not limited in embodiments of this application.

The home device that may serve as the UWB base station may provide at least one UWB base station. For example, it is assumed that the smart television shown in FIG. 1 includes three UWB chips. The smart television may pro-vide three UWB base stations, for example, three UWB base stations respectively marked as Base(0), Base(1), and Base (2) in FIG. 5. It is assumed that the smart air conditioner shown in FIG. 1 includes one UWB chip. The smart air conditioner may provide one UWB base station.

(3) UWB Coordinate System Constructed by Using UWB Base Stations

The UWB coordinate system in embodiments of this application may be constructed by using at least three UWB base stations. In embodiments of this application, for example, the UWB coordinate system is constructed by using three UWB base stations. The three UWB base stations have the following characteristics: The three UWB base stations are located on a same plane (referred to as a UWB plane). Two coordinate axes of the UWB coordinate system constructed by using the three UWB base stations are located on the UWB plane, and the other coordinate axis is perpendicular to the UWB plane.

In some embodiments, the three UWB base stations may be provided by a large-screen device. The large-screen device includes a display (including a display panel, for example, a liquid crystal panel) and a plurality of (three or more) UWB chips. For example, the large-screen device may be the smart television shown in FIG. 1. The smart television includes the display and the three UWB chips. The display of the smart television may serve as the UWB plane. The smart television may provide the three UWB base stations such as Base(0), Base(1), and Base(2) shown in FIG. 5.

Figure 5:
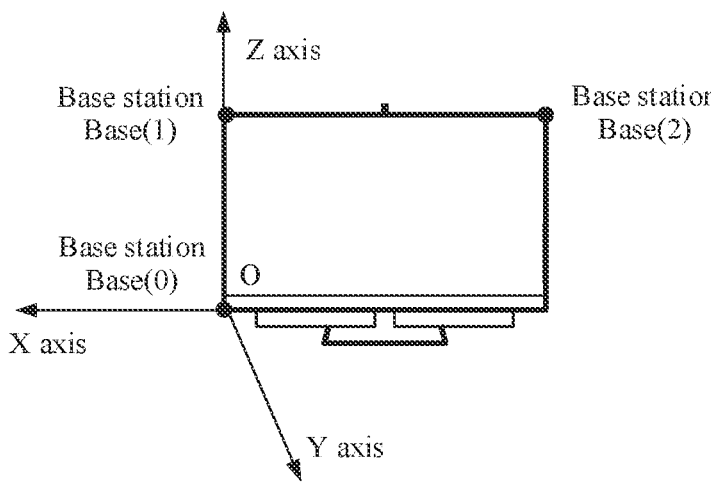
FIG. 5 is a schematic diagram of a UWB coordinate system constructed by using UWB base stations according to an embodiment of this application.

FIG. 5 is a schematic diagram of an instance of a UWB coordinate system according to an embodiment of this application. As shown in FIG. 5, an X axis, a Y axis, and a Z axis that use O as a coordinate origin form a right-hand rectangular coordinate system. The coordinate origin O shown in FIG. 5 may be an antenna center of a UWB base station Base(0) provided by the smart television, namely, an antenna center of a UWB chip corresponding to Base(0). The X axis is parallel to a bottom edge of the smart television and points to the outside of the display. The Z axis is perpendicular to a plane on which the X axis is located, and points to an antenna center of another UWB base station Base(1) provided by the smart television, namely, an antenna center of a UWB chip corresponding to Base(1). The Y axis is perpendicular to the X axis, and is perpen-dicular to the Z axis. The Y axis is parallel to an orientation of the display of the smart television. The coordinate system shown in FIG. 5 is the UWB coordinate system. Generally, a location of a home device is fixed. Therefore, a UWB coordinate system of a UWB base station may also be referred to as a fixed coordinate system.

In some other embodiments, the three UWB base stations may be three home devices on which UWB chips are installed. For example, all of the smart television, the smart sound box, and the smart air conditioner shown in FIG. 1 may be equipped with UWB chips, and a router, the smart television, and the smart air conditioner may form a UWB plane. For a method for constructing a UWB coordinate system by using the router, the smart television, and the smart air conditioner, refer to the method for constructing the UWB coordinate system by using Base(0), Base(1), and Base(2) of the smart television in the foregoing embodiment. Details are not described again in the embodiments of this application.

In some other embodiments, the three UWB base stations may be one or more dedicated UWB chips specially configured to assist the electronic device 100 in determining a home device to which the electronic device 100 points. There is a dedicated UWB chip. For a method for constructing a UWB coordinate system by using the dedicated UWB chips, refer to the method for constructing the UWB coordinate system by using Base(0), Base(1), and Base(2) of the smart television in the foregoing embodiment. Details are not described again in embodiments of this application.

In some other embodiments, the UWB base stations may be provided by a device including a preset plane. The device further includes at least three UWB chips. The at least three UWB chips are installed on the preset plane. The preset plane may be a plane whose area is greater than a preset threshold.

It can be learned from the foregoing description that the three UWB base stations for constructing the UWB coordinate system have the following characteristics: The three UWB base stations are located on a same plane (referred to as a UWB plane). Two coordinate axes of the UWB coordinate system constructed by using the three UWB base stations are located on the UWB plane, and the other coordinate axis is perpendicular to the UWB plane.

The preset plane in the embodiments is the foregoing UWB plane. The at least three UWB chips are installed on the preset plane, so that the UWB coordinate system can be conveniently constructed. For example, the device including the preset plane may be a refrigerator including at least three UWB chips. The preset plane may be a front surface or a side surface of the refrigerator, and the at least three UWB chips are disposed on the preset plane of the refrigerator.

It may be understood that a large-screen device (for example, a smart television) is usually installed in a house of a user. Therefore, the large-screen device may generally serve as a UWB base station. In this way, the user does not need to purchase the UWB base station, reducing costs. In the following embodiments, the method in embodiments of this application is described by using an example in which the UWB base station is the smart television (namely, a reference device).

(4) Spatial posture information of the electronic device 100 includes a pitch angle $\varphi$, an azimuth $\phi$, and a roll angle $\theta$ of a carrier coordinate system relative to a UWB coordinate system. The pitch angle $\varphi$, the azimuth $\phi$, and the roll angle $\theta$ may be collectively referred to as an Euler angle.

The pitch angle $\varphi$ of the carrier coordinate system of the electronic device 100 relative to the UWB coordinate system is an included angle between a $y_B$ axis of the carrier coordinate system of the electronic device 100 and a plane (that is, equivalent to a horizontal plane) on which XOY of the UWB coordinate system is located.

Figure 6:
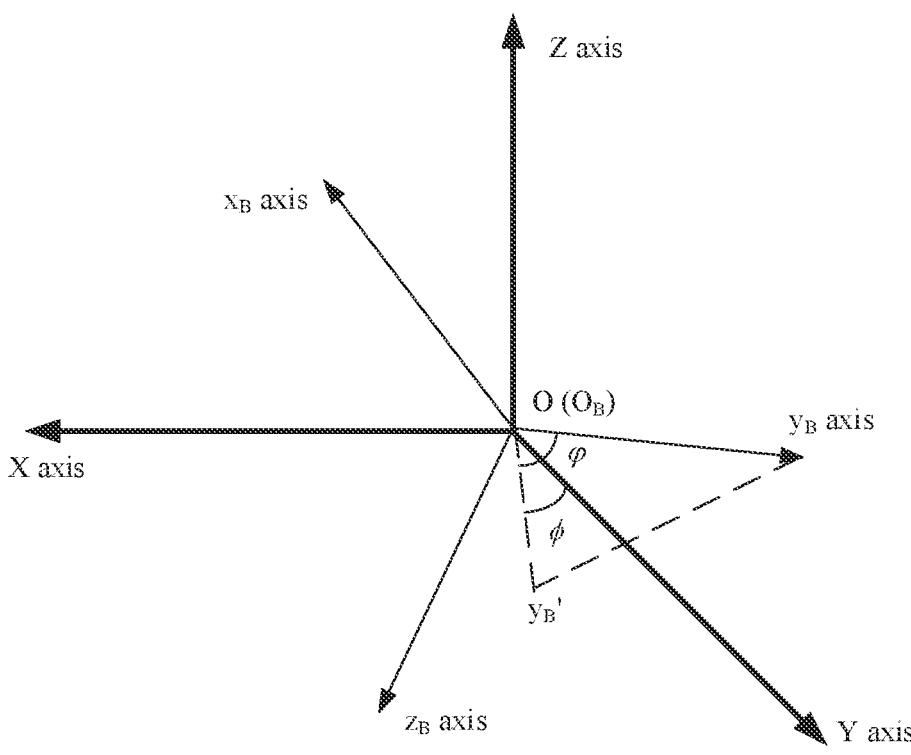
FIG. 6 is a schematic diagram of a pitch angle and an azimuth of a carrier coordinate system of an electronic device relative to a UWB coordinate system according to an embodiment of this application.

For example, the electronic device 100 is a mobile phone shown in FIG. 4. As shown in FIG. 6, the pitch angle $\varphi$ of the carrier coordinate system of the mobile phone relative to the UWB coordinate system is the included angle between the $y_B$ axis and the plane (that is, equivalent to the horizontal plane) on which XOY is located. As shown in FIG. 6. $Oy_B'$ (namely, $O_B x_B'$) is vertical projection of the s axis on the plane on which XOY is located. It may be understood that the pitch angle $\varphi$ of the carrier coordinate system of the mobile phone relative to the UWB coordinate system is an included angle between $Oy_B'$ (namely, $O_B y_B'$) and the $y_B$ axis. When an included angle between the $y_B$ axis and a Z axis is greater than 90°, the pitch angle q is positive.

The azimuth $\phi$ of the carrier coordinate system of the electronic device 100 relative to the UWB coordinate system is an included angle between the vertical projection $Oy_B\alpha$ of the $y_B$ axis of the carrier coordinate system of the electronic device 100 on the plane on which XOY is located and a Y axis of the UWB coordinate system.

For example, the electronic device 100 is the mobile phone shown in FIG. 4. As shown in FIG. 6, the azimuth $\phi$ of the carrier coordinate system of the mobile phone relative to the UWB coordinate system is the included angle between the vertical projection $Oy_B'$ of the $y_B$ axis of the carrier coordinate system of the mobile phone on the plane on which XOY is located and the Y axis of the UWB coordinate system. When $Oy_B'$ (namely, $O_B y_B'$) deflects clockwise on the plane on which XOY is located with a change of the $y_B$ axis, the azimuth $\phi$ is positive.

The roll angle $\theta$ of the carrier coordinate system of the electronic device 100 relative to the UWB coordinate system is an included angle between a $z_B$ axis of the carrier coordinate system of the electronic device 100 and a plane (equivalent to a vertical plane) on which $y_B OZ$ is located.

Figure 7:
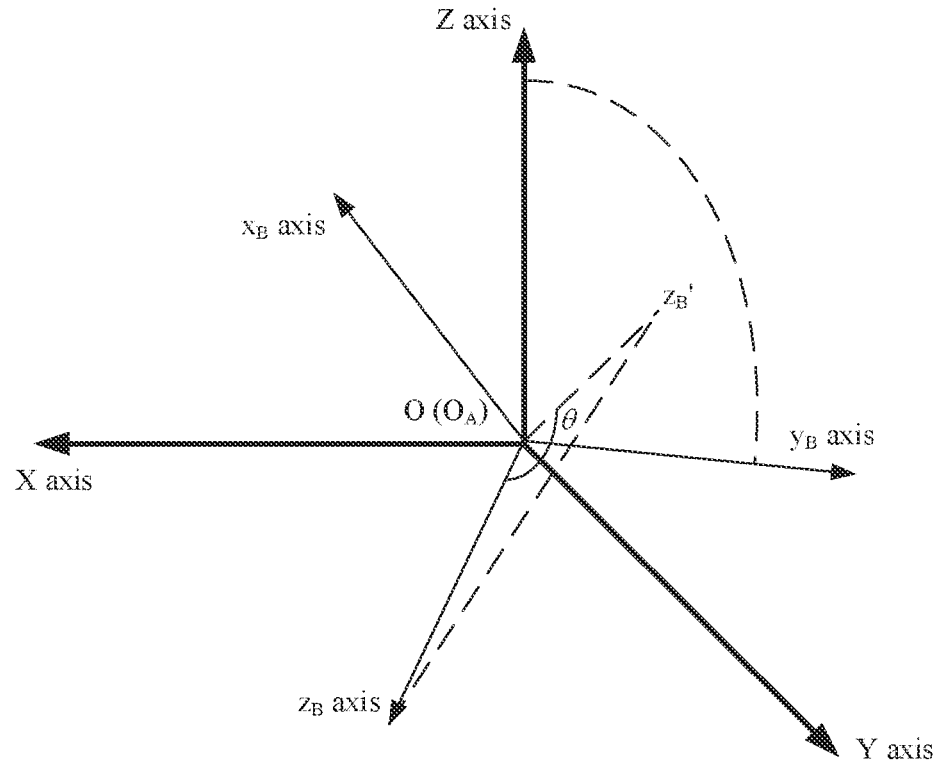
FIG. 7 is a schematic diagram of a roll angle of a carrier coordinate system of an electronic device relative to a UWB coordinate system according to an embodiment of this application.

For example, the electronic device 100 is the mobile phone shown in FIG. 4. As shown in FIG. 7, the roll angle $\theta$ of the carrier coordinate system of the mobile phone relative to the UWB coordinate system is an included angle between the $z_B$ axis of the carrier coordinate system of the mobile phone and the plane (equivalent to the vertical plane) on which $y_B OZ$ passing through the $y_B$ axis is located. As shown in FIG. 7. $Oz_B'$ (namely, $O_B z_B'$) is vertical projection of the $z_B$ axis on the plane on which $y_B OZ$ passing through the $y_B$ axis is located, it may be understood that the roll angle $\theta$ of the carrier coordinate system of the mobile phone relative to the UWB coordinate system alternatively is an included angle between $Oz_B s'$ (namely, $O_B z_B$) and the $z_B$ axis. When the $z_B$ axis rotates clockwise, the roll angle $\theta$ is positive.

It should be noted that FIG. 3 is merely used as an example to describe the carrier coordinate system of the smart remote control, and FIG. 4 is merely used as an example to describe the carrier coordinate system of the mobile phone. The carrier coordinate system of the electronic device 100 may alternatively be defined according to another rule. For example, the coordinate origin may alternatively be any other point on the electronic device 100 or the outside of the electronic device 100. Directions of the three axes of the carrier coordinate system are not limited to directions shown by the $x_A$ axis, the $y_A$ axis, and the $z_A$ axis shown in FIG. 3, or directions shown by the $x_B$ axis, the $y_B$ axis, and the $z_B$ axis shown in FIG. 4. FIG. 5 is merely an example to describe the UWB coordinate system. The UWB coordinate system may alternatively be defined according to another rule. Directions of the three axes of the UWB coordinate system are not limited to directions shown by the X axis, the Y axis, and the Z axis shown in FIG. 5. Settings of locations of the coordinate origins and directions of the coordinate axes of the carrier coordinate system and the UWB coordinate system are not limited in embodiments of this application. The following describes the method according to embodiments of this application with reference to a specific embodiment.

In some solutions, an inertial measurement unit (inertial measurement unit, IMU) chip is configured in an electronic device (for example, a mobile phone or a smart remote control). The electronic device may input spatial posture information a of the electronic device in a geodetic coordinate system by using a magnetometer and an accelerometer in the IMU chip, and then transfer the spatial posture information a that is in the geodetic coordinate system and that is measured by the IMU chip to a UWB coordinate system based on posture transfer parameters of the geodetic coordinate system and the UWB coordinate system. In this way, posture information b of the electronic device in the UWB coordinate system can be obtained.

However, to obtain accurate spatial posture information in the geodetic coordinate system, a user needs to operate the electronic device to perform figure 8 shake or 10 side calibration to perform initial calibration of the magnetometer, where user operations are complex. In addition, by using the solutions, if a magnetic field around the electronic device changes, for example, if a metal object approaches the electronic device, the magnetometer is affected, and accuracy of the spatial posture information a output by the IMU chip is also greatly affected. In this case, the magnetometer needs to be re-calibrated. In addition, by using the foregoing solutions, the posture transfer parameters of the geodetic coordinate system and the UWB coordinate system need to be known, and then the posture information b of the electronic device in the UWB coordinate system can be obtained.

In some other solutions, an IMU module (for example, an IMU chip) and a UWB module (for example, a UWB chip) are configured in an electronic device (for example, a mobile phone or a smart remote control). The IMU module shown in FIG. 8(a) may include an accelerometer and a gyroscope, and the IMU module may be configured to obtain spatial posture information of the electronic device. Specifically, the electronic device may guide a user to operate the electronic device to point to a specific direction in a specific posture, to obtain initial posture information I of the electronic device. Then, the electronic device may obtain posture change information of the electronic device (including acceleration, posture, and location information of three axes) through measurement by using the IMU module. Finally, the electronic device may obtain real-time posture information II of the electronic device based on the initial posture information I and the posture change information.

Figure 8A:
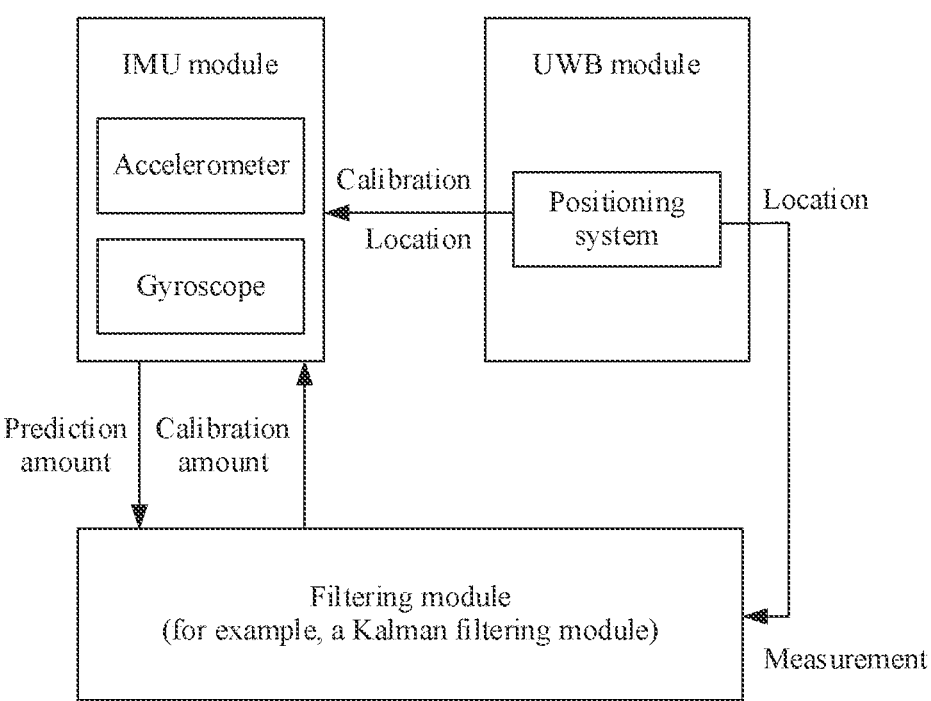
FIG. 8($a$) and FIG. 8($b$) are schematic diagrams of system architectures for measuring locations and postures by electronic devices according to a conventional technology and an embodiment of this application.

The UWB module shown in FIG. 8(a) may provide a positioning system of the electronic device, and the positioning system is configured to obtain spatial location information of the electronic device. It is considered that an error of the posture change information collected by the IMU module accumulates over time, but an error of the spatial location information collected by the UWB module does not accumulate over time. Therefore, the spatial location information collected by the UWB module shown in FIG. 8(a) may be further used to calibrate the posture change information collected by the IMU module. A filtering module (for example, a Kalman filtering module) shown in FIG. 8(a) may integrate a measurement (namely, the spatial location information) from the UWB module and a prediction amount (namely, the posture change information) from the IMU module, to obtain a calibration amount. The calibration amount may be used as the posture change information, and is used to obtain the real-time posture information II based on the initial posture information I.

However, the electronic device can obtain the accurate initial posture information I only when the user operates the electronic device to point to the specific direction in the specific posture. The solutions depend on reliability of a user operation, and a human operation may cause an error of the initial posture information I, to affect the accuracy of the real-time posture information II.

In addition, in the solutions, the posture change information of the electronic device is obtained based on a change of an angular velocity of the gyroscope. However, if a posture of the electronic device changes but a location of the electronic device does not change, an error of the posture change information measured by the gyroscope is relatively large. In this way, the accurate real-time posture information II cannot be obtained.

In conclusion, the spatial posture information of the electronic device cannot be accurately measured by using the existing solutions. In other words, the electronic device has relatively low posture measurement accuracy. In this way, an effect of directionally controlling the home device by the electronic device is affected.

Therefore, an embodiment of this application provides a method for obtaining posture information. The method may be applied to a communication system shown in FIG. 1. The communication system includes an electronic device (for example, a mobile phone or a smart remote control) 100 and a plurality of home devices (for example, a smart television, a smart air conditioner, a smart desk lamp, a smart sound box, and a router).

Figure 8B:
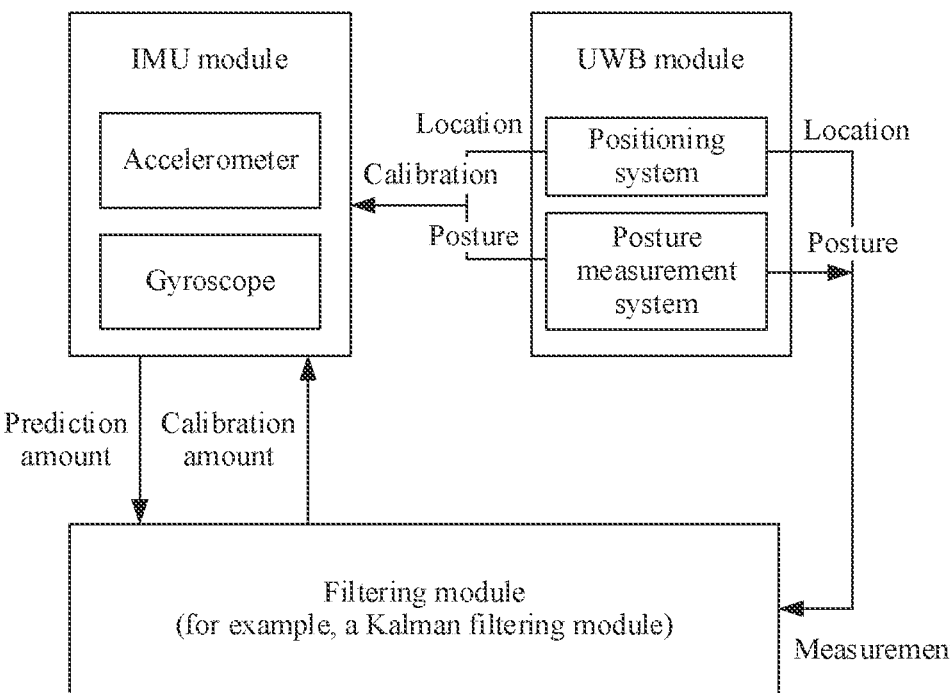

In this embodiment of this application, as shown in FIG. 8(b), a UWB module of the electronic device 100 may not only provide a positioning system, but also provide a posture measurement system. The posture measurement system is configured to measure spatial posture information of the electronic device 100. In other words, the electronic device 100 may measure the spatial posture information of the electronic device by using the UWB module.

It should be noted that, although an error of the posture change information collected by the IMU module shown in FIG. 8(a) or FIG. 8(b) accumulates over time, the posture change information collected by the IMU module also has an advantage of relatively high continuity. Therefore, as shown in FIG. 8(b), in this embodiment of this application, measurement data of the IMU module may be further calibrated by using the spatial posture information obtained through measurement by the posture measurement system of the UWB module. In this way, an error of the posture change information collected by the IMU module can be reduced, and in addition, the IMU module and the UWB module jointly provide a posture measurement function for the electronic device, to ensure continuity of posture information measured by the electronic device. For a function of a filtering module shown in FIG. 8(b), refer to the description of the filtering module shown in FIG. 8(a) in the foregoing embodiment. Details are not described again in this embodiment of this application.

Figure 10:
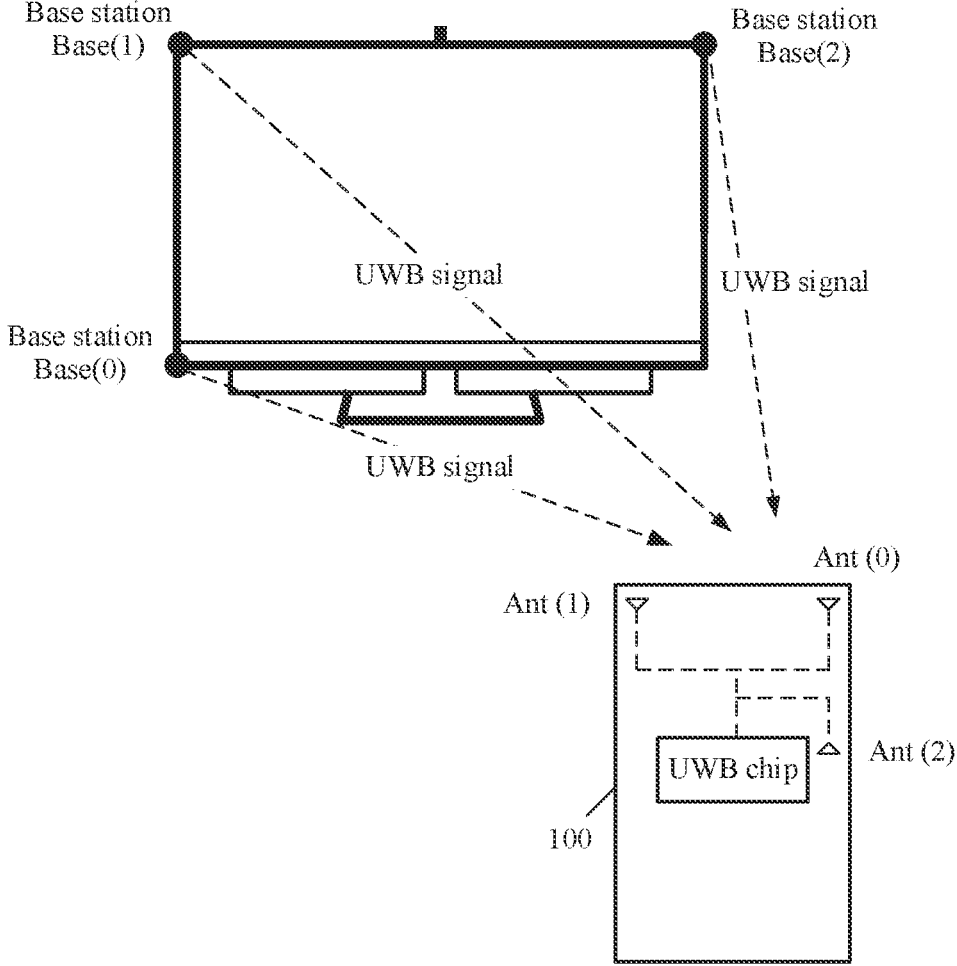
FIG. 10 is a schematic diagram of a UWB base station and an electronic device according to an embodiment of this application.

Specifically, as shown in FIG. 10, the UWB module is installed in the electronic device 100, and the electronic device 100 further includes a multi-antenna module (for example, the multi-antenna module includes an antenna 0, an antenna 1, and an antenna 2 shown in FIG. 10). The UWB module may be a UWB chip. The electronic device 100 may receive a UWB signal from each UWB base station by using the multi-antenna module, and then obtain spatial posture information of the electronic device 100 based on the received UWB signal.

Specifically, the electronic device 100 may receive the UWB signal from each UWB base station by using the multi-antenna module, and measure a direction of arrival of the UWB signal; and then, the electronic device 100 obtains the spatial posture information of the electronic device 100 based on the direction of arrival of the received UWB signal.

It should be understood that the direction of arrival of each UWB signal is obtained by the electronic device 100 through real-time measurement by using the multi-antenna module. Therefore, accuracy of the direction of arrival of each UWB signal can be ensured. It can be learned that, by using this solution, an error between the posture information obtained by the electronic device 100 through calculation and actual posture information can be reduced, posture measurement accuracy of the electronic device can be improved, and then an effect of directionally controlling a home device by the electronic device can be improved.

Further, by using this solution, the spatial posture information of the electronic device 100 can be obtained through measurement without calibrating a magnetometer in the electronic device 100, and without a user operating the electronic device 100 in a specific manner. In this way, user operations in a process of measuring posture information can be reduced.

For example, the electronic device 100 may be a mobile phone, a tablet computer, a smart remote control, a wearable device (for example, a smart band, a smart watch, or smart glasses), a palmtop computer, or an augmented reality (augmented reality, AR)/virtual reality (virtual reality, VR) device. Alternatively, the electronic device 100 may be an electronic device of another type, for example, a portable multimedia player (Portable Multimedia Player, PMP) or a media player. A specific type of the electronic device 100 is not limited in this embodiment of this application.

Figure 9:
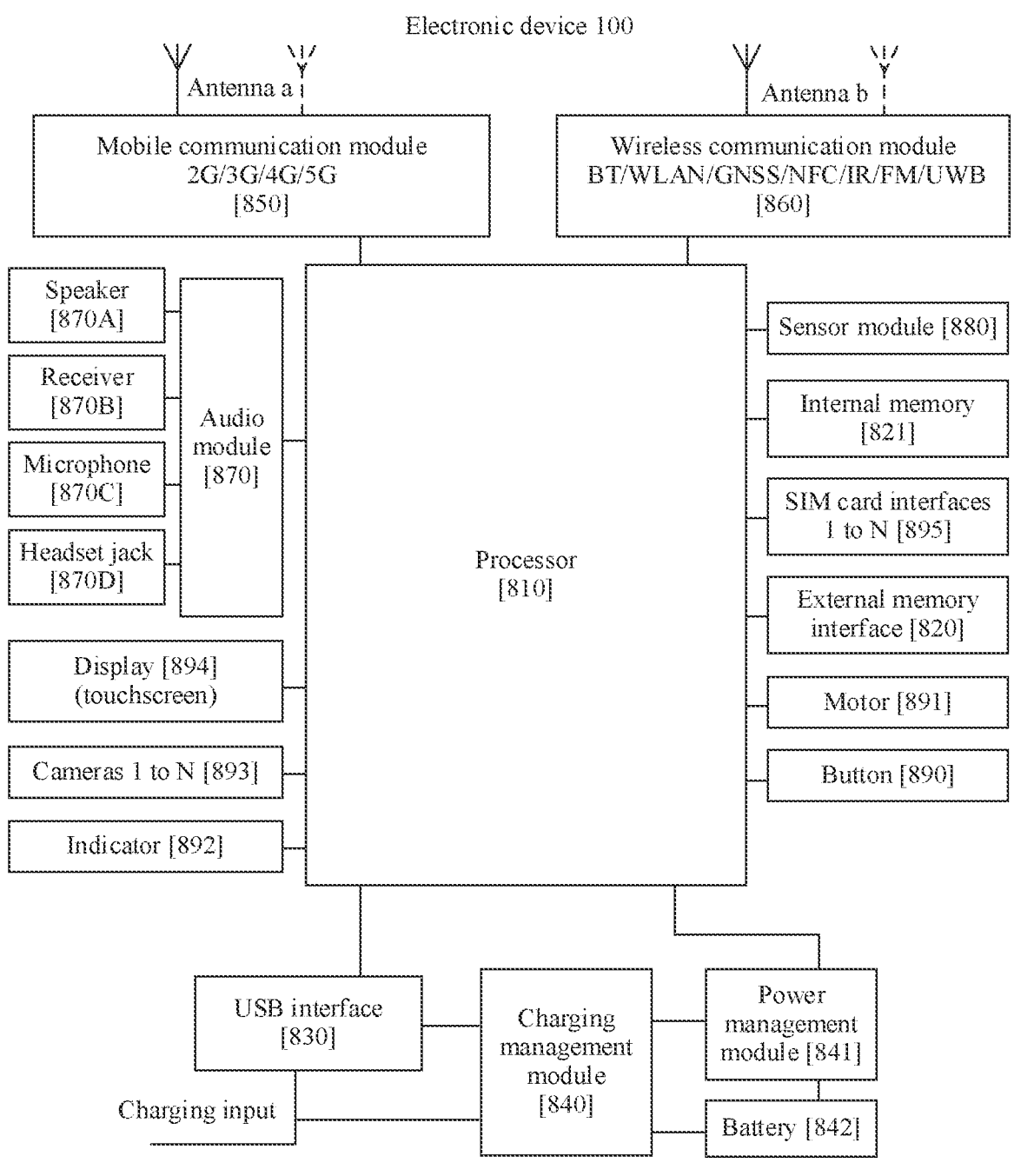
FIG. 9 is a schematic diagram of a hardware structure of an electronic device according to an embodiment of this application.

Refer to FIG. 9. In this application, an electronic device 100 provided in this application is described by using an example in which the electronic device 100 is a mobile phone. As shown in FIG. 9, the electronic device 100 may include a processor 810, an external memory interface 820, an internal memory 821, a universal serial bus (universal serial bus, USB) interface 830, a charging management module 840, a power management module 841, a battery 842, an antenna a, an antenna b, a mobile communication module 850, a wireless communication module 860, an audio module 870, a speaker 870A, a receiver 870B, a microphone 870C, a headset jack 870D, a sensor module 880, a button 890, a motor 891, an indicator 892, a camera 893, a display 894, a subscriber identification module (subscriber identification module, SIM) card interface 895, and the like.

The sensor module 880 may include a pressure sensor, a gyroscope sensor, a barometric pressure sensor, a magnetic sensor, an acceleration sensor, a distance sensor, an optical proximity sensor, a fingerprint sensor, a temperature sensor, a touch sensor, an ambient light sensor, a magnetometer, a bone conduction sensor, and the like.

In some embodiments, the sensor module 880 may include three acceleration sensors and three gyroscope sensors. The three acceleration sensors and the three gyroscope sensors may form a 6 axis IMU. Alternatively, the sensor module 880 may include three acceleration sensors, three gyroscope sensors, and three magnetometers. The three acceleration sensors, the three gyroscope sensors, and the three magnetometers may form a 9 axis IMU. The IMU may be configured to measure spatial posture information of the electronic device 100, including a pitch angle, an azimuth, and a roll angle. In this embodiment of this application, spatial posture information is not measured by using the IMU.

It may be understood that the structure shown in this embodiment does not constitute a specific limitation on the electronic device 100. In some other embodiments, the electronic device 100 may include more or fewer components than those shown in the figure, or some components may be combined, or some components may be split, or different component arrangements may be used. The components shown in the figure may be implemented by hardware, software, or a combination of software and hardware.

The processor 810 may include one or more processing units. For example, the processor 810 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors.

The controller may be a nerve center and a command center of the electronic device 100. The controller may generate an operation control signal based on an instruction operation code and a time sequence signal, to complete control of instruction fetching and instruction execution.

The memory may be further disposed in the processor 810, and is configured to store instructions and data. In some embodiments, the memory in the processor 810 is a cache. The memory may store instructions or data just used or cyclically used by the processor 810. If the processor 810 needs to use the instructions or the data again, the processor 810 may directly invoke the instructions or the data from the memory. This avoids repeated access and reduces waiting time of the processor 810, thereby improving system efficiency.

In some embodiments, the processor 810 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

It may be understood that an interface connection relationship between the modules shown in the embodiments is merely used as an example for description, and does not constitute a limitation on a structure of the electronic device 100. In some other embodiments, the electronic device 100 may alternatively use an interface connection manner different from an interface connection manner in the foregoing embodiments, or use a combination of a plurality of interface connection manners.

The charging management module 840 is configured to receive charging input from the charger. The charger may be a wireless charger or a wired charger. The charging management module 840 supplies power to the electronic device by using the power management module 841 while charging the battery 842.

The power management module 841 is configured to connect the battery 842 and the charging management module 840 to the processor 810. The power management module 841 receives input from the battery 842 and/or the charging management module 840, and supplies power to the processor 810, the internal memory 821, an external memory, the display 894, the camera 893, the wireless communication module 860, and the like. In some embodiments, the power management module 841 and the charging management module 840 may be alternatively disposed in a same component.

A wireless communication function of the electronic device 100 may be implemented by using the antenna a, the antenna b, the mobile communication module 850, the wireless communication module 860, the modem processor, the baseband processor, and the like. In some embodiments, in the electronic device 100, the antenna a and the mobile communication module 850 are coupled, and the antenna b and the wireless communication module 860 are coupled, so that the electronic device 100 can communicate with a network and another device by using a wireless communication technology. For example, in embodiments of this application, the electronic device 100 may send a control instruction to another home device by using the wireless communication technology.

The antenna a and the antenna b are configured to: transmit and receive electromagnetic wave signals. Each antenna in the electronic device 100 may be configured to cover one or more communication frequency bands. Different antennas may further be multiplexed to improve antenna utilization. For example, the antenna a may be multiplexed as a diversity antenna of a wireless local area network. In some other embodiments, an antenna may be used in combination with a tuning switch.

The mobile communication module 850 may provide a wireless communication solution that includes 2G/3G/4G/5G or the like and that is applied to the electronic device 100. The mobile communication module 850 may include at least one filter, a switch, a power amplifier, a low noise amplifier (low noise amplifier, LNA), and the like. The mobile communication module 850 may receive an electromagnetic wave by using the antenna a, perform processing such as filtering and amplification on the received electromagnetic wave, and transmit the electromagnetic wave to the modem processor for demodulation.

The mobile communication module 850 may further amplify a signal modulated by the modem processor, and convert the signal into an electromagnetic wave for radiation by using the antenna a. In some embodiments, at least some functional modules of the mobile communication module 850 may be disposed in the processor 810. In some embodiments, at least some functional modules of the mobile communication module 850 and at least some modules of the processor 810 may be disposed in a same device.

The wireless communication module 860 may provide a wireless communication solution that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, a UWB technology, or the like and that is applied to the electronic device 100. For example, in embodiments of this application, the electronic device 100 may access a Wi-Fi network via the wireless communication module 860. For another example, in embodiments of this application, the electronic device 100 may send a message to the home device via the wireless communication module 860.

The wireless communication module 860 may provide a wireless communication solution of a UWB technology. That is, the wireless communication module 860 may include a UWB chip. The UWB technology is a wireless carrier communication technology. It does not use sinusoidal carrier to transmit data, but uses nanosecond-level non-sine narrow pulse to transmit data. Therefore, the UWB technology occupies a wide spectrum range. The UWB technology has the advantages of low system complexity, low transmission signal power spectral density, insensitivity to channel fading, low interception capability, high positioning accuracy, and the like. It is especially applicable to high-speed wireless access in densely-populated multipath areas such as indoor areas. In addition, the electronic device 100 may measure, by using the UWB technology, a distance between the electronic device 100 and a device supporting the UWB technology (for example, a home device on which a UWB chip is installed).

The wireless communication module 860 may be one or more components integrating at least one communication processing module. The wireless communication module 860 receives an electromagnetic wave by using the antenna b, performs frequency modulation and filtering on an electromagnetic wave signal, and sends a processed signal to the processor 810. The wireless communication module 860 may further receive a to-be-sent signal from the processor 810, perform frequency modulation and amplification on the signal, and convert the signal into an electromagnetic wave for radiation by using the antenna b.

The antenna b may include the foregoing multi-antenna module. The multi-antenna module may include n antennas, where n≥3, and n is a positive integer. All the n antennas in the multi-antenna module are connected to the UWB chip of the electronic device 100. For example, n=3, the multi-antenna module may include Ant(0) (namely, the antenna 0), Ant(1) (namely, the antenna 1), and Ant(2) (namely, the antenna 2) shown in FIG. 10. The antenna 0, the antenna 1, and the antenna 2 are all connected to the UWB chip, and are configured to receive a UWB signal from another device.

The n antennas in the multi-antenna module may construct a carrier antenna coordinate system of the electronic device 100. Three axes of the carrier antenna coordinate system are respectively parallel to three axes of a carrier coordinate system of the electronic device 100. In the n antennas, Ant(0) serves as a coordinate origin of the carrier antenna coordinate system and Ant(i) is located on a coordinate axis of the carrier coordinate system or an extension line of the coordinate axis. A distance between Ant(i) and Ant(0) is U, and U≤λ. For example, U=λ/2. λ is a wavelength of a UWB signal, and a value of i is sequentially obtained in {1, 2, . . . , n−1}.

The UWB module of the electronic device 100 may include the foregoing multi-antenna module and the UWB chip. The antennas (such as Ant(0). Ant(1), and Ant(2)) in the multi-antenna module may be external antennas of the UWB chip. The multi-antenna module is electrically connected to the UWB chip. The multi-antenna module may be disposed on a backplane of the electronic device 100 (for example, a mobile phone). A board configured to deploy antennas of various communication modules (such as Wi-Fi, UWB, and Bluetooth) is disposed below a back of the electronic device 100 (for example, the mobile phone). The multi-antenna module is disposed on the board.

For example, n=3, as shown in FIG. 10, Ant(0) is disposed on an upper right corner of the electronic device 100, Ant(1) is disposed on an upper side frame of the electronic device 100, a distance between Ant(1) and Ant(0) is U, Ant(2) is disposed on a right side frame of the electronic device 100, and a distance between Ant(2) and Ant(0) is U, and USA. As shown in FIG. 10, the distance between Ant(1) and Ant(0) is λ/2, and the distance between Ant(1) and Ant(0) is λ/2.

Figure 11:
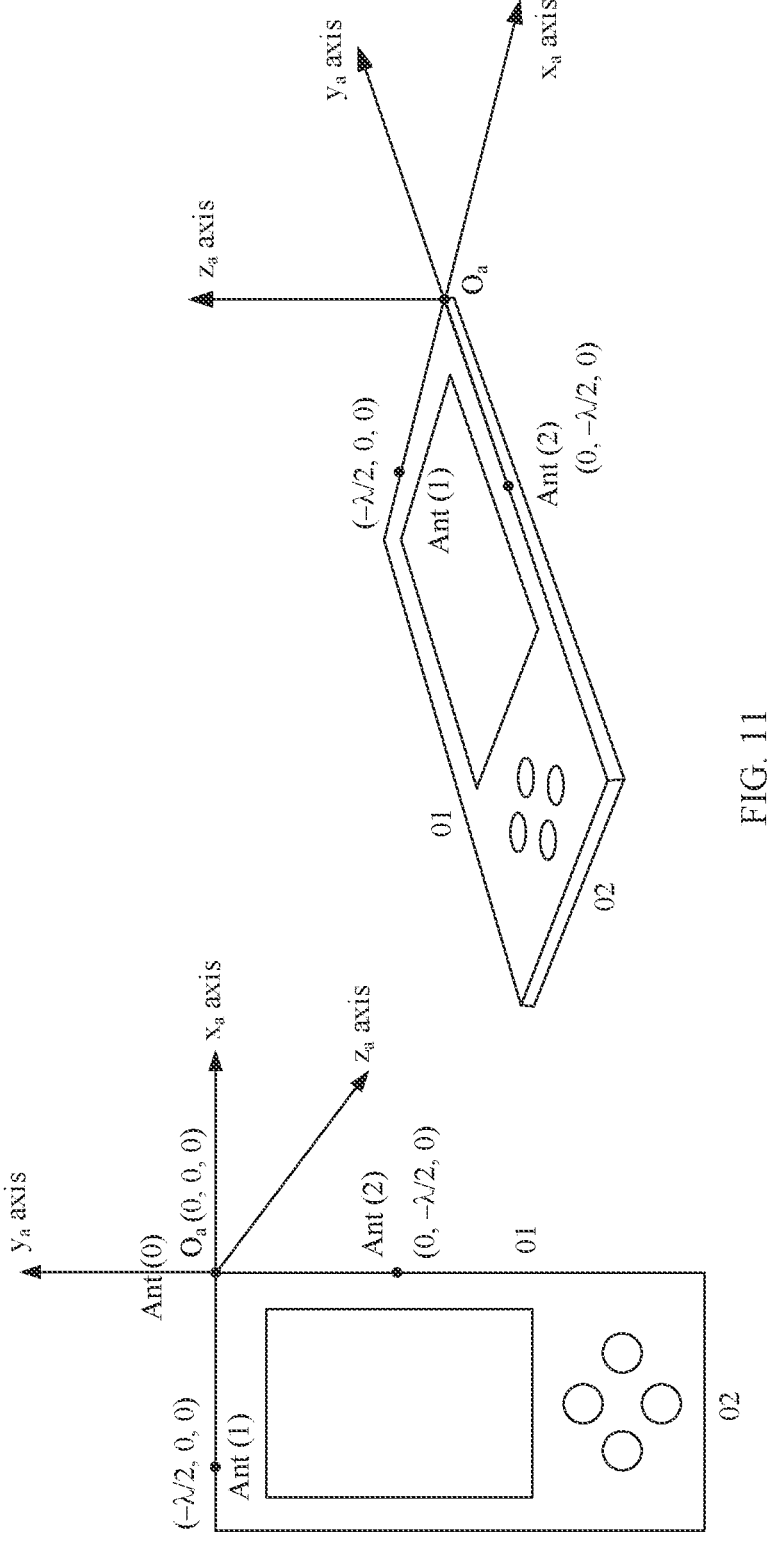
FIG. 11 is a schematic diagram of a carrier antenna coordinate system of a smart remote control according to an embodiment of this application.

For example, the electronic device 100 is the smart remote control shown in FIG. 3. FIG. 11 is a schematic diagram of an instance of a carrier antenna coordinate system of a smart remote control. The carrier antenna coordinate system of the smart remote control may be preconfigured in the smart remote control. As shown in FIG. 11, an $x_3$ axis, a $y_a$ axis, and a $z_a$ axis that use $O_a$ as a coordinate origin form a right-hand rectangular coordinate system. $O_a$ shown in FIG. 11 is a location of Ant(0). The $x_3$ axis is parallel to a connection line between Ant(0) and Ant(1), and the connection line between Ant(0) and Ant(1) is parallel to a short side 02 of the smart remote control. The $y_a$ axis is parallel to a long side 01 of the smart remote control and is upward, and a connection line between Ant(2) and Ant(0) is parallel to the long side 01 of the mobile phone. The $z_A$ axis is perpendicular to the $y_a$ axis, and is perpendicular to the Y, axis.

The coordinate system shown in FIG. 11 is the carrier antenna coordinate system of the smart remote control. It can be learned, by comparing the carrier antenna coordinate system shown in FIG. 11 with the carrier coordinate system shown in FIG. 3, that the $x_3$ axis is parallel to the $x_A$ axis, the $y_a$ axis is parallel to the $y_A$ axis, and the $z_a$ axis is parallel to the $z_A$ axis. As shown in FIG. 11, coordinates of Ant(0) in the carrier antenna coordinate system are (0, 0, 0), coordinates of Ant(1) are ($-\lambda/2$, 0, 0), and coordinates of Ant(2) are (0, $-\lambda/2$, 0). $\lambda$ is a wavelength of a UWB signal.

Figure 12:
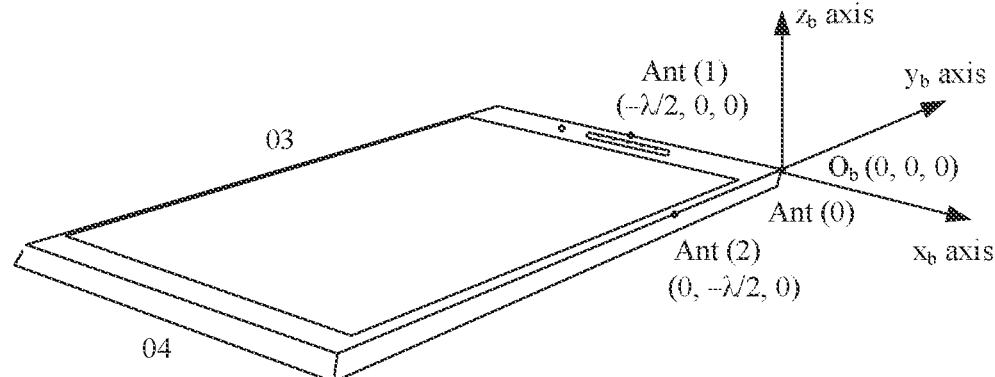
FIG. 12 is a schematic diagram of a carrier antenna coordinate system of a mobile phone according to an embodiment of this application.

For example, the electronic device 100 is the mobile phone shown in FIG. 4. FIG. 12 is a schematic diagram of an instance of a carrier antenna coordinate system of a mobile phone. The carrier antenna coordinate system of the mobile phone may be preconfigured in the mobile phone. As shown in FIG. 12, an $x_b$ axis, a $y_b$ axis, and a $z_b$ axis that use $O_b$ as a coordinate origin form a right-hand rectangular coordinate system. $O_b$ shown in FIG. 12 is a location of Ant(0). The $x_b$ axis is parallel to a connection line between Ant(0) and Ant(1), and the connection line between Ant(0) and Ant(1) is parallel to a short side 04 of the mobile phone. The $y_b$ axis is parallel to a long side 03 of the mobile phone and is upward, and a connection line between Ant(2) and Ant(0) is parallel to the long side 03 of the mobile phone. The $z_b$ axis is perpendicular to the $y_b$ axis, and is perpendicular to the $x_b$ axis.

The coordinate system shown in FIG. 12 is the carrier antenna coordinate system of the mobile phone. It can be learned, by comparing the carrier antenna coordinate system shown in FIG. 12 with the carrier coordinate system shown in FIG. 4, that the $x_b$ axis is parallel to the $x_B$ axis, the $y_b$ axis is parallel to the $y_B$ axis, and the $z_b$ axis is parallel to the $z_B$ axis. As shown in FIG. 12, coordinates of Ant(0) in the carrier antenna coordinate system are (0, 0, 0), coordinates of Ant(1) are ($\lambda/2$, 0, 0), and coordinates of Ant(2) are (0, $-\lambda/2$, 0). $\lambda$ is a wavelength of a UWB signal.

It should be noted that, because the three axes of the carrier antenna coordinate system of the electronic device 100 are parallel to the three axes of the carrier coordinate system of the electronic device 100, an Euler angle of the carrier coordinate system of the electronic device 100 relative to the UWB coordinate system is equal to an Euler angle of the carrier antenna coordinate system of the electronic device 100 relative to the UWB coordinate system. Specifically, a pitch angle $\varphi$ of the carrier coordinate system of the electronic device 100 relative to the UWB coordinate system is equal to a pitch angle $\varphi$ of the carrier antenna coordinate system of the electronic device 100 relative to the UWB coordinate system; an azimuth $\phi$ of the carrier coordinate system of the electronic device 100 relative to the UWB coordinate system is equal to an azimuth $\phi$ of the carrier antenna coordinate system of the electronic device 100 relative to the UWB coordinate system; and a roll angle $\theta$ of the carrier coordinate system of the electronic device 100 relative to the UWB coordinate system is equal to a roll angle $\theta$ of the carrier antenna coordinate system of the electronic device 100 relative to the UWB coordinate system.

Therefore, it can be learned that spatial posture information of the electronic device 100 may include the pitch angle $\varphi$, the azimuth $\phi$, and the roll angle $\theta$ of the carrier antenna coordinate system of the electronic device 100 relative to the UWB coordinate system.

The electronic device 100 may implement a display function by using the GPU, the display 894, the application processor, and the like. The GPU is a microprocessor for image processing, and is connected to the display 894 and the application processor. The GPU is configured to: perform mathematical and geometric computation, and render an image. The processor 810 may include one or more GPUs that execute program instructions to generate or change display information.

The display 894 is configured to display an image, a video, and the like. The display 894 includes a display panel. For example, in embodiments of this application, the display 894 may be configured to display a control interface for controlling the foregoing first device.

The electronic device 100 can implement an image shooting function by using the ISP, the camera 893, the video codec, the GPU, the display 894, the application processor, and the like. The ISP is configured to process data fed back by the camera 893. The camera 893 is configured to capture a static image or a video. In some embodiments, the electronic device 100 may include one or N cameras 893, and N is a positive integer greater than 1.

The external memory interface 820 may be used to connect to an external storage card, for example, a micro SD card, to extend a storage capability of the electronic device 100. The external storage card communicates with the processor 810 through the external memory interface 820, to implement a data storage function. For example, files such as music and videos are stored in the external storage card.

The internal memory 821 may be configured to store computer-executable program code. The executable program code includes instructions. The processor 810 runs the instructions stored in the internal memory 821 to perform various function applications of the electronic device 100 and data processing. For example, in embodiments of this application, the processor 810 may execute the instructions stored in the internal memory 821, and the internal memory 821 may include a program storage area and a data storage area.

The program storage area may store an operating system, an application required by at least one function (for example, a voice playing function or an image playing function), and the like. The data storage area may store data (for example, audio data or an address book) created during use of the electronic device 100, and the like. In addition, the internal memory 821 may include a high-speed random access memory, and may further include a nonvolatile memory, for example, at least one magnetic disk storage device, a flash memory, or a universal flash storage (universal flash storage, UFS).

The electronic device 100 may implement audio functions by using the audio module 870, the speaker 870A, the receiver 870B, the microphone 870C, the headset jack 870D, the application processor, and the like, for example, implement a music playback function and a recording function.

The button 890 includes a power button, a volume button, and the like. The button 890 may be a mechanical button, or may be a touch button. The motor 891 may generate a vibration prompt. The motor 891 may be configured to provide an incoming call vibration prompt, or may be configured to provide a touch vibration feedback. The indicator 892 may be an indicator light, and may be configured to indicate a charging status and a power change, or may be configured to indicate a message, a missed call, a notification, and the like. The SIM card interface 895 is configured to connect to a SIM card. The SIM card may be inserted into the SIM card interface 895 or removed from the SIM card interface 895, to implement contact with or separation from the electronic device 100. The electronic device 100 may support one or N SIM card interfaces, where N is a positive integer greater than 1. The SIM card interface 895 may support a nano-SIM card, a micro-SIM card, a SIM card, and the like.

All methods in the following embodiments may be implemented on the electronic device 100 having the foregoing hardware structure.

Embodiments of this application provide a method for obtaining posture information. The method may be applied to the foregoing electronic device 100. In the following embodiments, the method according to embodiments of this application is described by using an example in which the electronic device 100 shown in FIG. 1 is the mobile phone 100 and the UWB base station is the smart television shown in FIG. 1.

The smart television may provide three UWB base stations such as Base(0), Base(1), and Base(2) shown in FIG. 5. The three UWB base stations may construct the UWB coordinate system shown in FIG. 5. The mobile phone 100 includes a UWB module, and the UWB module includes a UWB chip and a multi-antenna module. For example, the multi-antenna module may include n antennas, for example, three antennas. The n antennas may be Ant antennas such as Ant(0), Ant(1), and Ant(2) shown in FIG. 12. The mobile phone 100 may further include an IMU module (for example, an IMU chip). The carrier coordinate system shown in FIG. 4 and the carrier antenna coordinate system shown in FIG. 12 are configured in the mobile phone 100.

A smart home application (Application, APP) for controlling a home device is further installed in the mobile phone 100. The mobile phone 100 may implement directional control on the home device by using the smart home APP. The mobile phone 100 implements directional control on the home device, and needs to obtain spatial posture information of the mobile phone 100 in real time.

In some embodiments, after being powered on, the mobile phone 100 may perform the method in embodiments of this application to obtain the spatial posture information of the mobile phone 100, to implement the directional control on the home device.

In some other embodiments, after starting the smart home APP, the mobile phone 100 may perform the method in embodiments of this application to obtain the spatial posture information of the mobile phone 100, to implement the directional control on the home device. After the mobile phone 100 starts the smart home APP, the smart home APP may be run in the foreground, or may be run in the background. In a case, when the mobile phone 100 runs the smart home APP in the foreground, the mobile phone 100 may perform the method in embodiments of this application, to obtain the spatial posture information of the mobile phone 100 in real time. In another case, regardless of whether the mobile phone 100 runs the smart home APP in the foreground or the background, the mobile phone 100 can perform the method in embodiments of this application only when the mobile phone 100 starts the smart home APP, to obtain the spatial posture information of the mobile phone 100 in real time.

In some other embodiments, after starting a preset function, the mobile phone 100 may perform the method in embodiments of this application to obtain the spatial posture information of the mobile phone 100, to implement the directional control on the home device. The preset function is a function of directionally controlling the home device.

Figure 13:
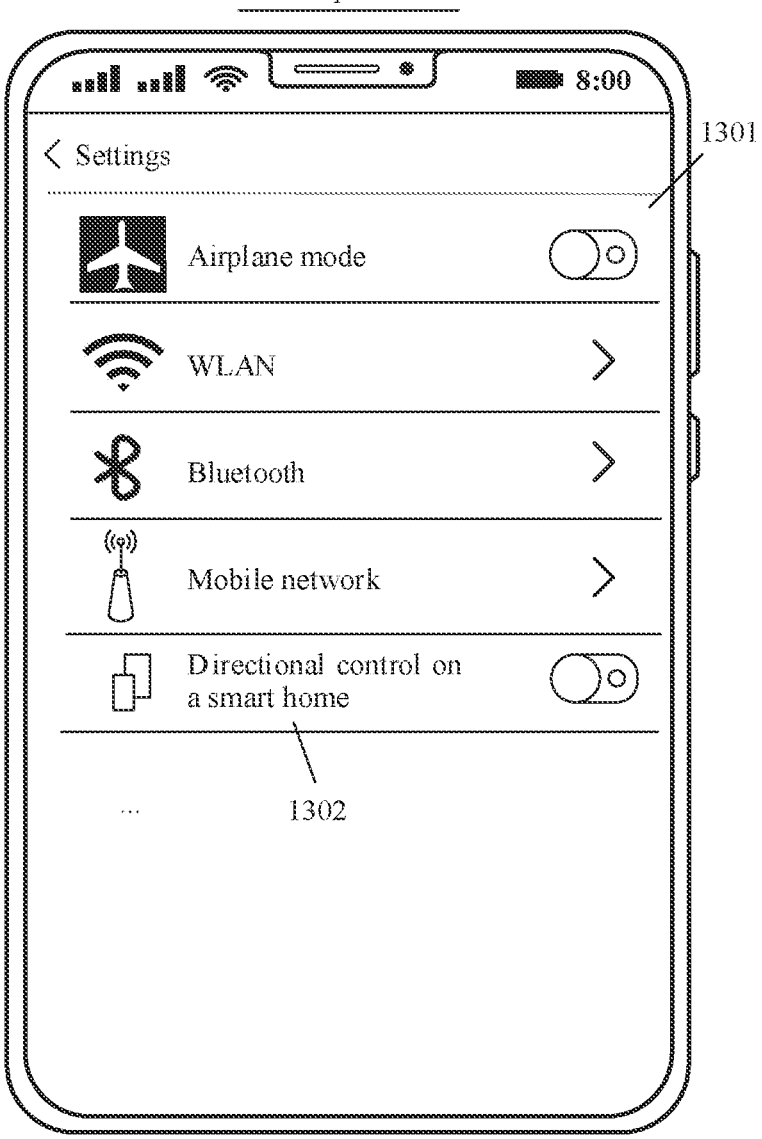
FIG. 13 is a schematic diagram of a display interface of an electronic device according to an embodiment of this application.

In an implementation, a setting interface of the mobile phone 100 may include an on/off option of the preset function. For example, the setting interface 1301 shown in FIG. 13 includes a "Directional control on a smart home" option 1302. The "Directional control on a smart home" option 1302 is the on/off option of the preset function, and is used to enable and disable the preset function.

Figure 14:
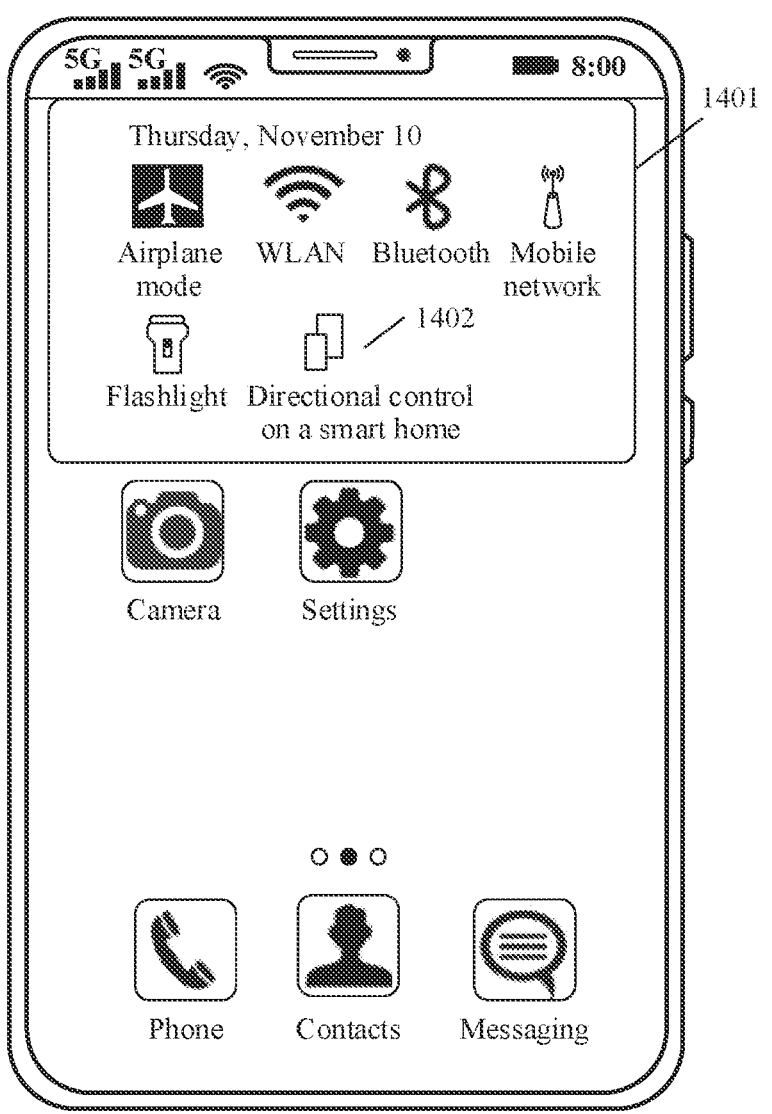
FIG. 14 is a schematic diagram of another display interface of an electronic device according to an embodiment of this application.

In another implementation, a notification bar of the mobile phone 100 may include the on/off option of the preset function. For example, the notification bar 1401 shown in FIG. 14 includes a "Directional control on a smart home" option 1402. The "Directional control on a smart home" option 1402 is the on/off option of the preset function, and is used to enable and disable the preset function.

In another implementation, the setting interface of the smart home APP may include the on/off option (not shown in the figure) of the preset function, to enable and disable the preset function.

Figure 15A:
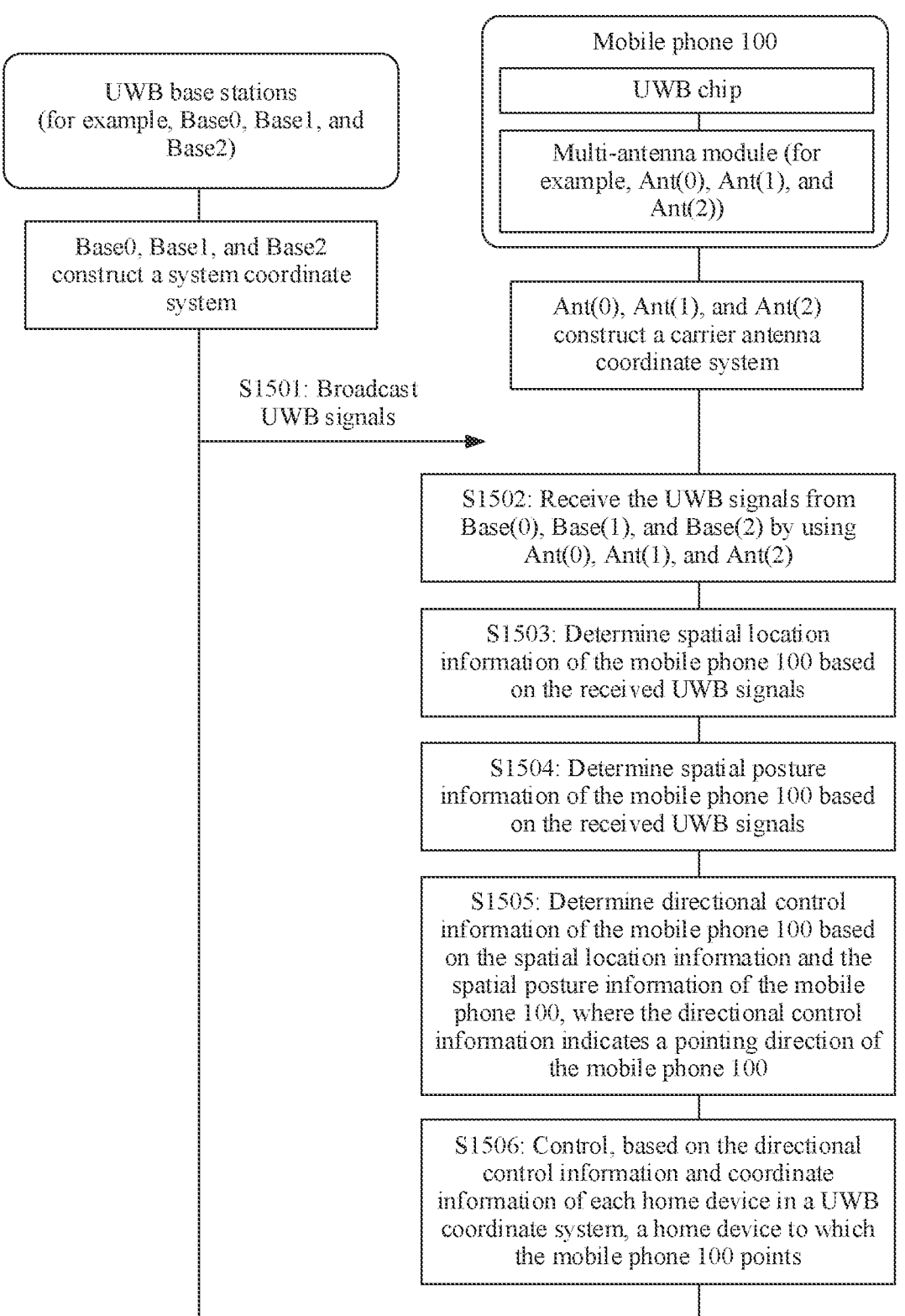
FIG. 15A is a flowchart of a method for obtaining posture information according to an embodiment of this application.

It should be understood that, to implement directional control on a home device, the mobile phone 100 not only needs to obtain the spatial posture information of the mobile phone 100, but also needs to obtain spatial location information of the mobile phone 100. The spatial location information of the mobile phone 100 is coordinates of the mobile phone 100 in the UWB coordinate system (a UWB coordinate system shown in FIG. 5) provided by UWB base stations (such as Base(0), Base(1), and Base(2)). The spatial posture information of the mobile phone 100 may include a pitch angle $\varphi$, an azimuth $\phi$, and a roll angle $\theta$ of the carrier antenna coordinate system (or the carrier coordinate system) of the mobile phone 100 relative to the UWB coordinate system. As shown in FIG. 15A, the method in embodiments of this application may include S1501 to S1506.

Herein, m UWB base stations (such as Base(0), Base(1), and Base(2)) may perform S1501 to broadcast UWB signals. The mobile phone 100 may perform S1502 to receive the UWB signals from Base(0), Base(1), and Base(2) by using Ant(0), Ant(1), and Ant(2). Then, the mobile phone 100 may perform S1503 to determine spatial location information of the mobile phone 100 based on the received UWB signals. The spatial location information of the mobile phone 100 may be coordinates of Ant(0) in the multi-antenna module of the mobile phone 100 in the UWB coordinate system.

In S1503, the mobile phone 100 may separately measure a distance between the mobile phone 100 and each UWB base station based on the received UWB signals in S1502, and then calculate the spatial location information of the mobile phone 100 based on the distance between the mobile phone 100 and each UWB base station. For a specific method for calculating the spatial location information of the mobile phone 100 in S1503 by the mobile phone 100, refer to related descriptions in the following embodiments. Details are not described herein again.

After S1502, the mobile phone 100 may perform S1504 shown in FIG. 15A, to determine spatial posture information of the mobile phone 100 based on the received UWB signals. The spatial posture information of the mobile phone 100 may include the pitch angle φ, the azimuth φ, and the roll angle θ of the carrier antenna coordinate system of the mobile phone 100 relative to the UWB coordinate system.

It should be noted that, in this embodiment of this application, after S1502, the mobile phone 100 may perform S1503 and then S1504, or may perform S1504 and then S1503, or may perform S1503 and S1504 at the same time. A sequence of performing S1503 and S1504 by the mobile phone 100 is not limited in this embodiment of this application.

After S1503 and S1504, the mobile phone 100 may perform S1505 and S1506, S1505: Determine directional control information of the mobile phone 100 based on the spatial location information and the spatial posture information of the mobile phone 100, where the directional control information indicates a pointing direction of the mobile phone 100. S1506: The mobile phone 100 controls, based on the directional control information and coordinate information of each home device in the UWB coordinate system, a home device to which the mobile phone 100 points. For a specific method for performing S1505 and S1506 by the mobile phone 100 to implement directional control on the home device by the mobile phone 100, refer to detailed descriptions in a conventional technology. Details are not described again in this embodiment of this application.

A specific method for determining the spatial posture information of the mobile phone 100 by the mobile phone 100 in S1504 is described herein in this embodiment of this application. As shown in FIG. 15B, S1504 may include S1504A and S1504B.

The mobile phone 100 may perform S1504A shown in FIG. 15B to calculate an angle of arrival $\alpha_{(i, j)}$, of a UWB signal from a UWB base station j in the m UWB base stations relative to an antenna i. A value of j is sequentially obtained in $\{0, 1, 2, \ldots, m-1\}$, and the angle of arrival $\alpha_{(i, j)}$ is an included angle between a vector from the antenna i to the UWB base station j and a vector from the antenna i to an antenna 0 in the UWB coordinate system. Then, the mobile phone 100 may perform S1504B shown in FIG. 15B, to determine the spatial posture information of the electronic device based on a plurality of calculated angles of arrival, the UWB signals received from the m UWB base stations by using the n antennas, and coordinates of the n antennas in the carrier antenna coordinate system. The plurality of angles of arrival include the angle of arrival $\alpha_{(i, j)}$ obtained when a value of i is sequentially obtained in $\{1, 2, \ldots, n-1\}$ and a value of j is sequentially obtained in $\{0, 1, 2, \ldots, m-1\}$.

Figure 17A:
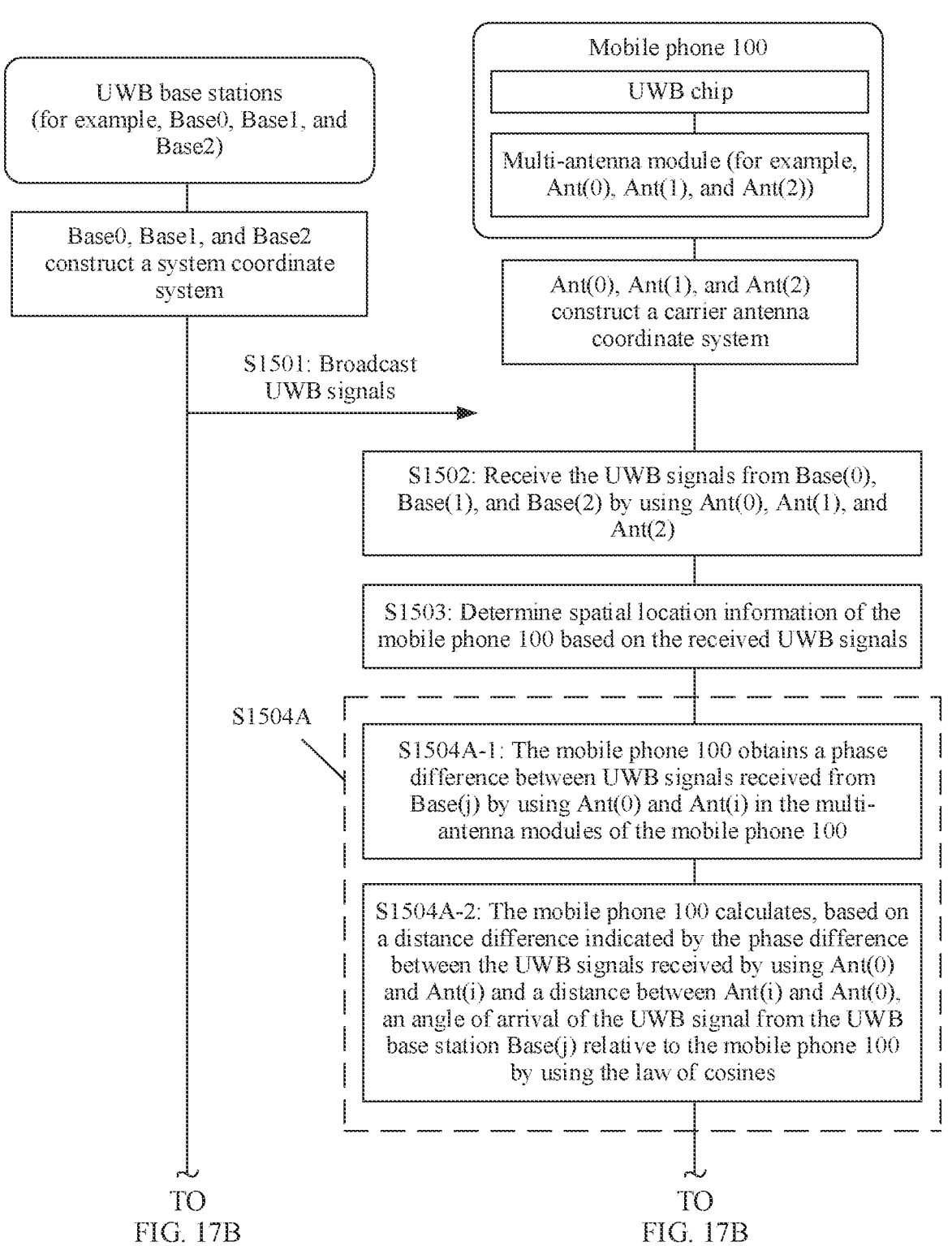

For example, a specific method for calculating the angle of arrival $\alpha_{(i, j)}$ by the mobile phone 100 in S1504A is described herein in this embodiment of this application. As shown in FIG. 17A and FIG. 17B, S1504A may include S1504A-1 and S1504A-2.

S1504A-1: The mobile phone 100 obtains a phase difference between UWB signals received from Base(j) by using Ant(0) and Ant(i) in the multi-antenna modules of the mobile phone 100.

Figure 16:
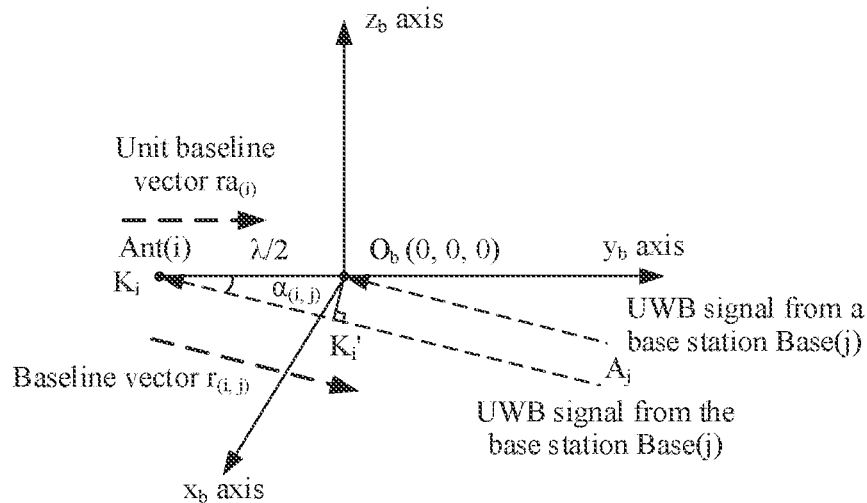
FIG. 16 is a schematic diagram of an angle of arrival of a UWB signal relative to a mobile phone according to an embodiment of this application.

A value of i is sequentially obtained in $\{1, 2, \ldots, n-1\}$, and a value of j is sequentially obtained in $\{0, 1, 2, \ldots, m-1\}$: m is a quantity of UWB base stations, $n \leq 3$, and m is a positive integer; Ant(0) is an antenna that is located at a coordinate origin of a carrier antenna coordinate system and that is in the multi-antenna module; and n is a quantity of antennas in the multi-antenna module, $n \geq 3$, and n is a positive integer. A distance between Ant(i) and Ant(0) in the multi-antenna module is U, where $U \leq \lambda$. For example, $U = \lambda/2$. For example, as shown in FIG. 16, a distance between Ant(0) and Ant(i) is: $K_i O_a = \lambda/2$, and the distance may be referred to as a baseline length. λ is a wavelength of a UWB signal sent by a UWB base station. A point $K_i$ shown in FIG. 16 is a location of Ant(i).

It may be understood that, because a distance between the UWB base station Base(j) and Ant(0) and a distance between Base(j) and Ant(i) are far greater than the baseline length $\lambda/2$, it may be approximately considered that connection lines between the two antennas (namely, Ant(0) and Ant(i)) and Base(j) are parallel to each other.

For example, a point $A_j$ shown in FIG. 16 indicates a location of Base(j). Because the distance (for example, $A_j O_a$) between Base(j) and Ant(0) and the distance between Base(j) and Ant(i) (for example, $A_j K_i$) are far greater than the baseline length $\lambda/2$, it may be approximately considered that $A_j O_a$ is parallel to $A_j K_i$. As shown in FIG. 16, a vertical line is made from $O_a$ to $A_j K_i$, to intersect with $A_j K_i$ at $K_i'$, and $A_j O_a = A_j K_5'$ In this case, it may be considered that a distance difference between the distance between Base(j) and Ant(i) and the distance between Base(j) and Ant(0) is $K_i K_i'$ shown in FIG. 16. For a same UWB signal broadcast by Base(j), when Ant(0) receives the UWB signal at $O_a$, the UWB signal needs to be propagated for a distance of $K_i K_i'$ before the UWB signal is received by using Ant(i).

Therefore, the mobile phone 100 may obtain, by using a phase comparator, a phase difference between the same UWB signal received by using Ant(i) and Ant(0) and broadcast by Base(j). The phase difference may be converted into the distance difference between the distance between Base(j) and Ant(i) and the distance between Base(j) and Ant(0).

For example, with reference to the schematic diagram of the UWB base station and the mobile phone 100 shown in FIG. 10, the mobile phone 100 performs S1504A-1 to obtain the phase difference shown in Table 1.

TABLE 1

| | Phase difference | | |
|---|---|---|---|
| | Base(0) | Base(1) | Base(2) |
| Ant(0) Ant(1) | Phase difference I | Phase difference i | Phase difference ① |
| Ant(0) Ant(2) | Phase difference II | Phase difference ii | Phase difference ② |

As shown in Table 1, when j=0, a phase difference between a UWB signal received from Base(0) by using Ant(0) and a UWB signal received from Base(0) by using Ant(1) is a phase difference 1, and a phase difference between the UWB signal received from Base(0) by using Ant(0) and a UWB signal received from Base(0) by using Ant(2) is a phase difference II.

As shown in Table 1, when j=1, a phase difference between a UWB signal received from Base(1) by using Ant(0) and a UWB signal received from Base(1) by using Ant(1) is a phase difference i, and a phase difference between the UWB signal received from Base(1) by using Ant(0) and a UWB signal received from Base(1) by using Ant(2) is a phase difference ii.

As shown in Table 1, when j=2, a phase difference between a UWB signal received from Base(2) by using Ant(0) and a UWB signal received from Base(2) by using Ant(1) is a phase difference ①, and a phase difference between the UWB signal received from Base(2) by using Ant(0) and a UWB signal received from Base(2) by using Ant(2) is a phase difference ②.

It should be noted that, for a method for calculating, by the mobile phone 100, the phase difference between UWB signals received from Base(j) by using Ant(0) and Ant(i), refer to related descriptions in the conventional technology. Details are not described again in this embodiment of this application.

S1504A-2: The mobile phone 100 calculates, based on the distance difference indicated by the phase difference between the UWB signals received by using Ant(0) and Ant(i) and the distance between Ant(i) and Ant(0), an angle of arrival of the UWB signal from the UWB base station Base(j) relative to the mobile phone 100 by using the law of cosines.

The angle of arrival of the UWB signal of the UWB base station Base(j) relative to the mobile phone 100 may include an angle of arrival $\alpha_{(i, j)}$ of the UWB signal of Base(j) relative to Ant(i). The angle of arrival $\alpha_{(i, j)}$ of the UWB signal of Base(j) relative to Ant(i) may be specifically an angle between a vector from Base(j) to Ant(i) in the UWB coordinate system and a vector from Ant(0) to Ant(i) in the UWB coordinate system. For example, as shown in FIG. 16, the angle of arrival $\alpha_{(i, j)}$ of the UWB signal of Base(j) relative to Ant(i) is an included angle between a vector $O_a K_i$ and a vector $A_j K_i$. The vector $A_j K_i$ is the vector from Base(j) to Ant(i) in the UWB coordinate system, and the vector $O_a K_i$ is the vector from Ant(0) to Ant(i) in the UWB coordinate system.

As shown in FIG. 16, $K_i O_a = \lambda/2$. It can be known from the foregoing embodiment that, the phase difference between the UWB signals received from Base(j) by using Ant(0) and Ant(i) may be converted into the distance difference between the distance between Ant(0) and Base(j) and the distance between Ant(i) and Base(j). In other words, the mobile phone 100 may obtain, through calculation based on the phase difference, a length of $K_i K_i'$ shown in FIG. 16.

A triangle $O_a K_i K_i'$ shown in FIG. 16 is a right-angle triangle. Therefore, the mobile phone 100 may obtain, through calculation by using the law of cosines and based on the length (namely, $\lambda/2$) of $K_i O_a$ and the length of $K_i K_i'$, the angle of arrival $\alpha_{(i, j)}$ of the UWB signal of Base(j) relative to Ant(i). It is assumed that $K_i K_i' = h_i$, $\alpha_{(i, j)} = \arccos[h_i/(\lambda/2)] = \arccos(2h_i/\lambda)$.

It should be noted that, the angle of arrival of the UWB signal of the UWB base station Base(j) relative to the mobile phone 100 may be divided into a horizontal angle of arrival and a vertical angle of arrival. From the main view of the mobile phone 100, Ant(0) and Ant(1) are basically located on a same horizontal line, and Ant(0) and Ant(2) are basically located on a same vertical line. Therefore, a horizontal angle of arrival of the UWB signal of Base(j) relative to the mobile phone 100 is an angle of arrival $\alpha_{(i, j)}$ of the UWB signal of Base(j) relative to Ant(1), and a vertical angle of arrival of the UWB signal of Base(j) relative to the mobile phone 100 is an angle of arrival $\alpha_{(2, j)}$ of the UWB signal of Base(j) relative to Ant(2).

Figure 18:
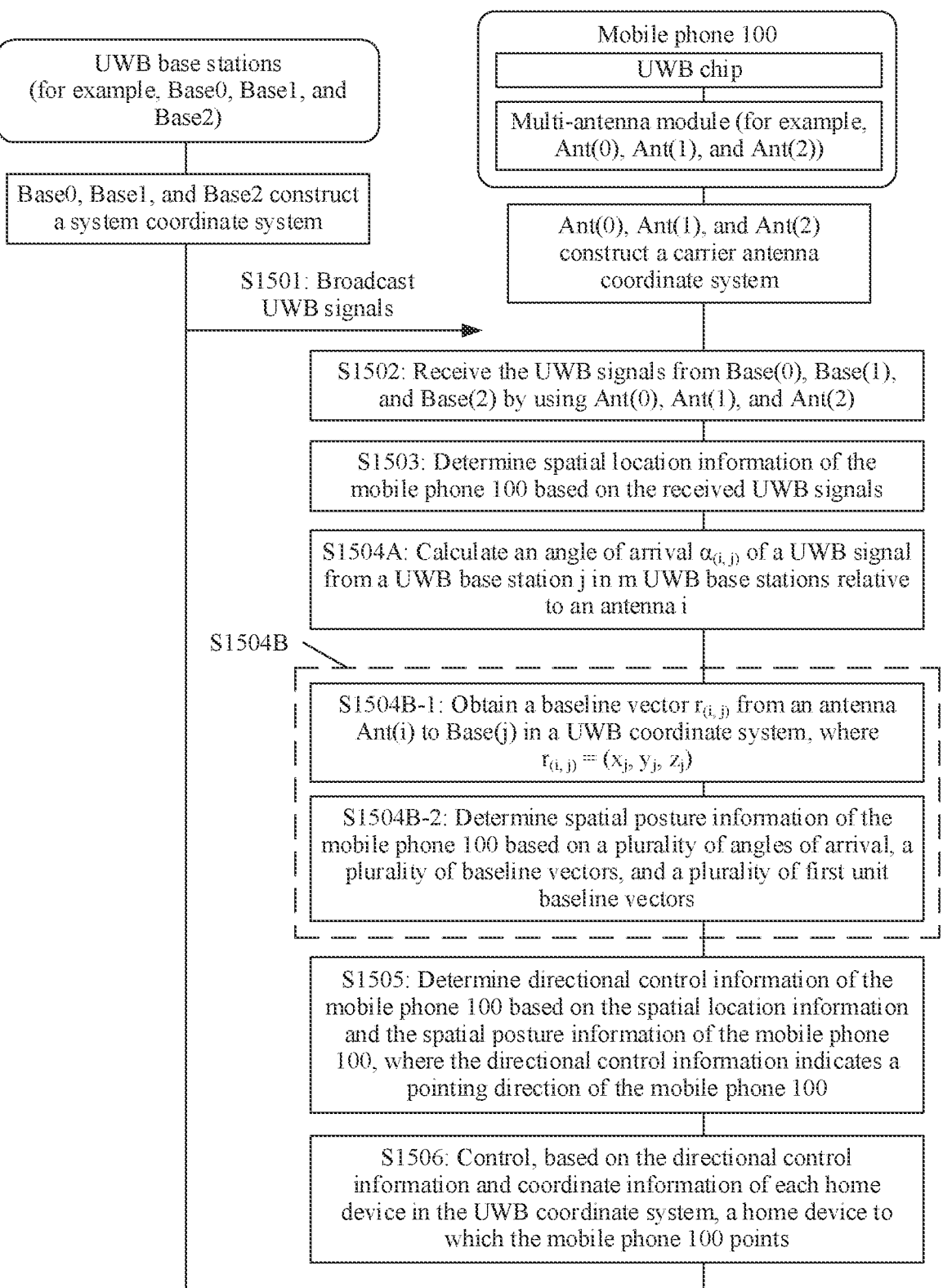
FIG. 18 is a flowchart of another method for obtaining posture information according to an embodiment of this application.

A specific method for determining the spatial posture information of the mobile phone 100 based on the plurality of angles of arrival, the received UWB signals, and the coordinates of the n antennas in the carrier coordinate system by the mobile phone 100 in S1504B is described herein in this embodiment of this application. As shown in FIG. 18, S1504B may include S1504B-1 and S1504B-2.

S1504B-1: The mobile phone 100 obtains a baseline vector $r_{(i, j)}$ from the antenna Ant(i) to Base(j) in the UWB coordinate system, where $r_{(i, j)} = (x_j, y_j, z_j)$.

The baseline vector $r_{(i, j)}$ is a direction vector from Ant(i) to Base(j) in the UWB coordinate system.

First, the mobile phone 100 may obtain coordinates of the antenna Ant(i) in the UWB coordinate system, for example. $Ant_i(a_i, b_i, c_i)$. Coordinates of the antenna Ant(0) in the UWB coordinate system may be used as coordinates of the mobile phone 100 in the UWB coordinate system. The mobile phone 100 stores the UWB coordinate system constructed by the UWB base stations and coordinates of Base(j) in the UWB coordinate system.

Then, the mobile phone 100 may obtain the coordinates of Base(j) in the UWB coordinate system, for example, Base $(j)(A_j, B_j, C_j)$. The mobile phone 100 may calculate a distance between Ant(i) and Base(j) through interaction between Ant(i) and each UWB base station (for example, Base(0), Base(1), and Base(2)), and then calculate the coordinates of Ant(i) in the UWB coordinate system based on the distance between Ant(i) and Base(j). For a method for obtaining, by the mobile phone 100, the coordinates of Ant(i) in the UWB coordinate system through interaction between Ant(i) and each UWB base station, refer to detailed descriptions in the following embodiments. Details are not described herein again.

Finally, the mobile phone 100 may calculate a vector $(A_j - a_i, B_j - b_i, C_j - c_i)$ from the antenna Ant(i) to Base(j) in the UWB coordinate system, to obtain the baseline vector $r_{(i, j)}$ from the antenna Ant(i) to Base(j) in the UWB coordinate system, where $$r_{(i,j)} = (x_j, y_j, z_j) = (A_j - a_i, B_j - b_i, C_j - c_i), \text{ and}$$

$$x_j = A_j - a_i, y_j = B_j - b_i, \text{ and } z_j = C_j - c_i.$$

The mobile phone 100 may calculate a modulus $|\overrightarrow{r_{(i,j)}}|$ of the vector $r_{(i, j)}$ by using Formula (1):

$$|\overrightarrow{r_{(i,j)}}| = \sqrt{(A_j - a_i)^2 + (B_j - b_i)^2 + (C_j - c_i)^2} \qquad \text{Formula (1)}$$

In this way, after S1504B-1, the moduli $|\overrightarrow{r_{(i,j)}}|$ of the vector $r_{(i, j)}$ and the vector $r_{(i, j)}$ are both known quantities. After S1504B-1, the mobile phone 100 may perform S1504B-2 to calculate the spatial posture information of the mobile phone 100.

S1504B-2: The mobile phone 100 determines the spatial posture information of the mobile phone 100 based on a plurality of angles of arrival, a plurality of baseline vectors, and a plurality of first unit baseline vectors.

The plurality of first unit baseline vectors include a first baseline vector $r_{(i, j)}$ obtained when a value of i is sequentially obtained in $\{1, 2, \ldots, n-1\}$ and a value of j is sequentially obtained in $\{0, 1, 2 \ldots, m-1\}$.

The plurality of first unit baseline vectors include a first unit baseline vector $rq_i$ obtained when a value of i is sequentially obtained in $\{1, 2, \ldots, n-1\}$ and a value of j is sequentially obtained in $\{0, 1, 2, \ldots, n-1\}$. The first unit baseline vector $rq_i$ is the unit direction vector from the antenna i to the antenna 0 in the carrier antenna coordinate system. A modulus of the first unit baseline vector $rq_i$ is equal to 1.

S1504B-2 may include S-1 and S-2.

S-1: The mobile phone 100 determines a plurality of second unit baseline vectors based on the plurality of angles of arrival and the plurality of baseline vectors.

The plurality of second unit baseline vectors include a second unit baseline vector $\overrightarrow{ra_{(i)}}$ obtained when a value of i is sequentially obtained in $\{1, 2, \ldots, n{-}1\}$ and a value of j is sequentially obtained in $\{0, 1, 2, \ldots, m{-}1\}$. The second unit baseline vector $\overrightarrow{ra_{(i)}}$ is a unit direction vector from the antenna i to the antenna 0 in the UWB coordinate system.

For example, it is assumed that the second unit baseline vector $\overrightarrow{ra_{(i)}}{=}(x_{(i)}, y_{(i)}, z_{(i)})$ from Ant(i) to Ant(0) in the UWB coordinate system $\overrightarrow{ra_{(i)}}$ is a unit vector in a direction from a point $K_i$ to a point $O_a$ shown in FIG. 16. A modulus of the second unit baseline vector $\overrightarrow{ra_{(i)}}$ is equal to 1, that is, $|\overrightarrow{ra_{(i)}}|{=}1$. $K_i$ shown in FIG. 16 is a location of the antenna Ant(i), and the point $O_a$ is a coordinate origin of the carrier antenna coordinate system of the mobile phone 100, and is also a location of the antenna Ant(0). Coordinates of the point $O_a$ shown in FIG. 16 in the carrier antenna coordinate system of the mobile phone 100 are $(0, 0, 0)$, and coordinates of $K_i$ in the carrier antenna coordinate system of the mobile phone 100 are $(0, -\lambda/2, 0)$. The second unit baseline vector $\overrightarrow{ra_{(i)}}{=}(x_{(i)}, y_{(i)}, z_{(i)})$ from Ant(i) to Ant(0) in the UWB coordinate system is an unknown quantity.

It can be known from FIG. 16 that an included angle between the second unit baseline vector $\overrightarrow{ra_{(i)}}$ and the baseline vector $r_{(i, j)}$ is $\alpha_{(i, j)}$, where $ra_{(i)}$, $(x_{(i)}, y_{(i)}, z_{(i)})$, and $r_{(i, j)}{=}(x_j, y_j, z_j)$.

Therefore, Formula (2) may be obtained:

$$\cos\alpha_{(i,j)} = \frac{\overrightarrow{ra_{(i)}} \times \overrightarrow{r_{(i,j)}}}{|\overrightarrow{ra_{(i)}}| \times |\overrightarrow{r_{(i,j)}}|} = \frac{x_{(i)} \times x_j + y_{(i)} \times y_j + z_{(i)} \times z_j}{|\overrightarrow{ra_{(i)}}| \times |\overrightarrow{r_{(i,j)}}|} \qquad \text{Formula (2)}$$

It can be learned from the foregoing descriptions that after S1504Ba, the moduli $|\overrightarrow{r_{(i,j)}}|$ of the vector $r_{(i, j)}{=}(x_j, y_j, z_j)$ and the vector $r_{(i, j)}$, are both known quantities. The second unit baseline vector $\overrightarrow{ra_{(i)}}{=}(x_{(i)}, y_{(i)}, z_{(i)})$ is an unknown quantity. Although the second unit baseline vector $\overrightarrow{ra_{(i)}}$ is an unknown quantity, $|\overrightarrow{ra_{(i)}}|$ is a known quantity, and $|\overrightarrow{ra_{(i)}}|{=}1$. With reference to Formula (1), Formula (3) to Formula (5) may be obtained:

$$\overrightarrow{ra_{(i)}} \times \overrightarrow{r_{(i,j)}} = x_{(i)} \times x_j + y_{(i)} \times y_j + z_{(i)} \times z_j \qquad \text{Formula (3)}$$

$$\overrightarrow{ra_{(i)}} \times \overrightarrow{r_{(i,j)}} = |\overrightarrow{ra_{(i)}}| \times |\overrightarrow{r_{(i,j)}}| \times \cos\alpha_{(i,j)} = |\overrightarrow{r_{(i,j)}}| \times \cos\alpha_{(i,j)} \qquad \text{Formula (4)}$$

$$\overrightarrow{ra_{(i)}} \times \overrightarrow{r_{(i,j)}} = \qquad \text{Formula (5)}$$

$$x_{(i)} \times x_j + y_{(i)} \times y_j + z_{(i)} \times z_j = \cos\alpha_{(i,j)} \times |\overrightarrow{r_{(i,j)}}| \times \lambda/2$$

The antenna Ant (j) may receive UWB signals from m UWB base stations. For the m UWB base stations. Equation set (1) may be obtained with reference to Formula (5): That is, if a value of j is sequentially obtained in $\{0, 1, 2, \ldots, m{-}1\}$, Equation set (1) may be obtained:

$$
\begin{cases}
x_{(i)} \times x_0 + y_{(i)} \times y_0 + z_{(i)} \times z_0 = \cos\alpha_{(i,1)} \times |\overrightarrow{r_{(i,0)}}| \\
x_{(i)} \times x_1 + y_{(i)} \times y_1 + z_{(i)} \times z_1 = \cos\alpha_{(i,2)} \times |\overrightarrow{r_{(i,1)}}| \\
\cdots \\
x_{(i)} + x_j + y_{(i)} \times y_j + z_{(i)} \times z_j = \cos\alpha_{(i,j)} \times |\overrightarrow{r_{(i,j)}}| \\
\cdots \\
x_{(i)} \times x_{m-1} + y_{(i)} \times y_{m-1} + z_{(i)} \times z_{m-1} = \cos\alpha_{(i,m)} \times |\overrightarrow{r_{(i,m-1)}}|
\end{cases} \qquad \text{Equation set (1)}
$$

It should be further noted that in Equation set (1), $x_j$, $y_j$, and $z_j$ are known quantities, and $\cos\alpha_{(i, j)}$ is known quantity. A value of i is sequentially obtained in $\{1, 2, \ldots, n{-}1\}$, n is a quantity of antennas in the multi-antenna module, $n{\geq}3$, and n is a positive integer. A value of j is sequentially obtained in $\{1, 2, \ldots, m{-}1\}$, m is a quantity of UWB base stations, $m{\geq}3$ and in is a positive integer. $x_{(i)}$, $y_{(i)}$, and $z_{(i)}$, are unknown quantities.

According to Equation set (1), Matrix equation (1) may be obtained:

$$GX{=}B \text{ Matrix} \qquad \text{equation (1)}$$

In Matrix equation $$G = \begin{bmatrix} x_1 & y_1 & z_1 \\ x_2 & y_2 & z_2 \\ \cdots & \cdots & \cdots \\ x_j & y_j & z_j \\ \cdots & \cdots & \cdots \\ x_m & y_m & z_m \end{bmatrix}, X = \begin{bmatrix} x_{(i)} \\ y_{(i)} \\ z_{(i)} \end{bmatrix}, \text{ and } B = \begin{bmatrix} \cos\alpha(i, 1) \times |\overrightarrow{r_{(i,1)}}| \\ \cos\alpha(i, 2) \times |\overrightarrow{r_{(i,2)}}| \\ \cdots \\ \cos\alpha(i, j) \times |\overrightarrow{r_{(i,j)}}| \\ \cdots \\ \cos\alpha(i, m) \times |\overrightarrow{r_{(i,m)}}| \end{bmatrix}.$$

The mobile phone 110 may resolve Matrix equation (1) by using a formula $X{=}(G^TG)^{-1}G^TB$. $G^T$ is a transposed matrix of G, and $$G^T = \begin{bmatrix} x_1 & x_2 & \cdots & x_j & \cdots & x_m \\ y_1 & y_2 & \cdots & y_j & \cdots & y_m \\ z_1 & z_2 & \cdots & z_j & \cdots & z_m \end{bmatrix}.$$

$G^TG$ indicates a product of $G^T$ and G. $(G^TG)^{-1}$ is an inverse matrix of $G^TG$. X=the inverse matrix of $G^TG{\times}G^T{\times}B$.

The mobile phone 100 may obtain a matrix X, namely, $$\begin{bmatrix} x_{(i)} \\ y_{(i)} \\ z_{(i)} \end{bmatrix},$$

through calculation by using $X{=}X{=}(G^TG)^{-1}G^TB$. In other words, the mobile phone 100 may obtain, through calculation, the unit baseline vector $ra_{(i)}{=}(x_{(i)}, y_{(i)}, z_{(i)})$ from Ant(i) to Ant(0) in the UWB coordinate system.

S-2: The mobile phone 100 determines the spatial posture information of the mobile phone 100 based on the plurality of first unit baseline vectors and the plurality of second unit baseline vectors.

The second unit baseline vector $ra_{(i)}$ is a unit direction vector from Ant(i) to Ant(0) in the UWB coordinate system. The first unit baseline vector $rq_i$ is a unit direction vector from Ant(i) to Ant(0) in a carrier antenna coordinate system b.

For example, it is assumed that the spatial posture information of the mobile phone 100 includes a pitch angle $\varphi_1$, an azimuth $\phi_1$, and a roll angle $\theta_1$. It should be noted that, after S-1, the unit baseline vector $ra_{(i)}{=}(x_{(i)}, y_{(i)}, z_{(i)})$ is a known quantity, that is, $(x_{(1)}, y_{(1)}, z_{(1)})$ and $(x_{(2)}, y_{(2)}, z_{(2)})$) are known quantities. The pitch angle $\varphi_1$, the azimuth $\phi_1$, and the roll angle $\theta_1$ are unknown quantities.

A user operates the mobile phone 100 to rotate around a pitch axis (namely, an $x_b$ axis), a roll axis (namely, a $y_b$ axis), and the azimuth axis (namely, a $z_b$ axis) of the carrier antenna coordinate system b in a fixed sequence based on the pitch angle $\varphi_1$, the azimuth $\phi_1$, and the roll angle $\theta_1$, so that the three axes of the carrier antenna coordinate system b are respectively parallel to three axes of a UWB coordinate system e.

In this embodiment of this application, when the three axes of the carrier antenna coordinate system b are respectively parallel to the three axes of the UWB coordinate system e, a spatial posture of the mobile phone 100 may be referred to as a preset initial posture. When the mobile phone 100 is at the preset initial posture, in the spatial posture information of the mobile phone 100, the pitch angle is $\varphi_0 = 0°$, the azimuth is $\phi_0 = 0$, and the roll angle is $\theta_0 = 0$.

Specifically, when the mobile phone 100 is at a spatial posture (referred to as an actual spatial posture) corresponding to the pitch angle $\varphi_1$, the azimuth $\phi_1$, and the roll angle $\theta_1$, the mobile phone 100 rotates $\varphi_1$ around the pitch axis (namely, the $x_b$ axis) of the carrier antenna coordinate system, rotates $\theta_1$ around the roll axis (namely, the $y_b$ axis), and rotates $\phi_1$ around the azimuth axis (namely, the $z_b$ axis) in a fixed sequence, so that the mobile phone 100 may be changed from the actual spatial posture to the preset initial posture.

It should be noted that the foregoing fixed sequence may be: first rotating $\varphi_1$ around the $x_b$ axis, then rotating $\theta_1$, around the $y_b$ axis, and finally rotating $\phi_1$ around the $z_b$ axis; or first rotating $\theta_1$ around the $y_b$ axis, then rotating $\varphi_1$ around the $x_b$ axis, and finally rotating $\phi_1$ around the $z_b$ axis; or first rotating $\varphi_1$ around the $x_b$ axis, then rotating $\theta_1$, around the $y_b$ axis, and finally rotating $\varphi_1$ around the $x_b$ axis, and the like. The foregoing fixed sequence is not limited in this embodiment of this application.

For example, in this embodiment of this application, the foregoing fixed sequence is: first rotating $\phi_1$ around the $z_b$ axis, then rotating $\varphi_1$ around the $x_b$ axis, and finally rotating $\theta_1$ around the $y_b$ axis. The following preset rotation matrix $$C_b^e$$

is a rotation matrix obtained when the mobile phone 100 rotates around the three axes of the carrier antenna coordinate system b in the sequence to change from the actual spatial posture to the preset initial posture. In the preset rotation matrix $$C_b^e,$$

a subscript b indicates the carrier antenna coordinate system of the mobile phone 100, and a superscript e indicates the UWB coordinate system constructed by using the UWB base stations. The preset rotation matrix $$C_b^e$$

is shown in Formula (6). PGP-30X

The foregoing $$C_b^e$$

is obtained by using the following three rotation matrices: Rotation matrix (1) to Rotation matrix (3).

$$C(z_b, \varphi_1) = \begin{bmatrix} \cos\varphi_1 & -\sin\varphi_1 & 0 \\ \sin\varphi_1 & \cos\varphi_1 & 0 \\ 0 & 0 & 1 \end{bmatrix} \qquad \text{Rotation Matrix (1)}$$

$$C(x_b, \phi_1) = \begin{bmatrix} 1 & 0 & 0 \\ 0 & \cos\phi_1 & -\sin\phi_1 \\ 0 & \sin\phi_1 & \cos\phi_1 \end{bmatrix} \qquad \text{Rotation matrix (2)}$$

$$C(y_b, \theta_1) = \begin{bmatrix} \cos\theta & 0 & \sin\theta_1 \\ 0 & 1 & 0 \\ -\sin\theta_1 & 0 & \cos\theta_1 \end{bmatrix} \qquad \text{Rotation matrix (3)}$$

The foregoing $C(z_b, \varphi_1)$ is a rotation matrix obtained by the mobile phone 100 rotating $\phi_1$ around the n axis of the carrier antenna coordinate system b. $C(x_b, \phi_1)$ is a rotation matrix obtained by the mobile phone 100 rotating $\varphi_1$, around the $x_b$ axis of the carrier antenna coordinate system b. $C(y_b, \theta_1)$ is a rotation matrix obtained by the mobile phone 100 rotating $\theta_1$ around the $y_b$ axis of the carrier antenna coordinate system b.

$$C_b^e = C(z_b, \varphi_1) \times C(x_b, \phi_1) \times C(y_b, \theta_1),$$

where it should be understood that, $$C_b^e$$

may also be referred to as a coordinate conversion matrix between the carrier antenna coordinate system b and the UWB coordinate system e. A coordinate parameter (for example, a vector) in the carrier antenna coordinate system b may be converted into a coordinate parameter (for example, a vector) in the UWB coordinate system e by using $$C_b^e.$$

The spatial posture information (including the pitch angle $\varphi_1$, the azimuth $\phi_1$, and the roll angle $\theta_1$) of the mobile phone 100 is an unknown quantity.

Therefore, the mobile phone 100 may obtain Formula (7) according to a coordinate system conversion principle:

$$C_b^e = \begin{bmatrix} \cos\theta_1\cos\varphi_1 - \sin\phi_1\sin\theta_1\sin\varphi_1 & -\cos\phi_1\sin\varphi_1 & \sin\theta_1\cos\varphi_1 + \sin\phi_1\cos\theta_1\sin\varphi_1 \\ \cos\theta_1\cos\varphi_1 + \sin\phi_1\sin\theta_1\cos\varphi_1 & \cos\phi_1\cos\varphi_1 & \sin\theta_1\sin\varphi_1 + \sin\phi_1\cos\theta_1\cos\varphi_1 \\ -\cos\phi\sin\theta_1 & \sin\phi_1 & \cos\phi_1\cos\theta_1 \end{bmatrix} \quad \text{Formula (6)}$$

In Formula (7), $$\begin{bmatrix} x_{(1)} \\ y_{(1)} \\ z_{(1)} \end{bmatrix}_e = \qquad\qquad\qquad \text{Formula (7)}$$

$$[\, x_{(1)} \quad y_{(1)} \quad z_{(1)} \,]_e^T = C_b^e \times \begin{bmatrix} -1 \\ 0 \\ 0 \end{bmatrix}_b = C_b^e \times [\, -1 \quad 0 \quad 0 \,]_b^{\,T}$$

corresponds to a second unit baseline vector $ra_{(1)}(x_{(1)}, y_{(1)}, z_{(1)})$ from Ant(1) to Ant(0) in the UWB coordinate system e; and $$\begin{bmatrix} x_{(1)} \\ y_{(1)} \\ z_{(1)} \end{bmatrix}_e$$

corresponds to a first unit baseline vector $rq_i(-1, 0, 0)$ from Ant(1) to Ant(0) in the carrier antenna coordinate system b.

$$\begin{bmatrix} -1 \\ 0 \\ 0 \end{bmatrix}_b$$

As shown in FIG. 12, the coordinates of the antenna Ant(1) in the carrier antenna coordinate system b are $(-\lambda/2, 0, 0)$. Therefore, the first unit baseline vector $(-1, 0, 0)$ from Ant(1) to Ant(0) in the carrier antenna coordinate system b may be obtained.

Formula 8 may be obtained based on Formula (7):

$$\begin{bmatrix} x_{(1)} \\ y_{(1)} \\ z_{(1)} \end{bmatrix}_e = C_b^e \times \begin{bmatrix} -1 \\ 0 \\ 0 \end{bmatrix}_b = \begin{bmatrix} -(\cos\theta_1\cos\varphi_1 - \sin\phi_1\sin\theta_1\sin\varphi_1) \\ -(\cos\theta_1\cos\varphi_1 + \sin\phi_1\sin\theta_1\cos\varphi_1) \\ -\cos\phi_1\sin\theta_1 \end{bmatrix}_e \quad \text{Formula (8)}$$

Formula (9) may be further obtained according to the coordinate system conversion principle:

$$\begin{bmatrix} x_{(2)} \\ y_{(2)} \\ z_{(2)} \end{bmatrix}_e = \qquad\qquad\qquad \text{Formula (9)}$$

$$[\, x_{(2)} \quad y_{(2)} \quad z_{(2)} \,]_e^T = C_b^e \times \begin{bmatrix} 0 \\ -1 \\ 0 \end{bmatrix}_b = C_b^e \times [\, 0 \quad -1 \quad 0 \,]_b^{\,T}$$

In Formula (9), $$\begin{bmatrix} x_{(2)} \\ y_{(2)} \\ z_{(2)} \end{bmatrix}_e$$

corresponds to a second unit baseline vector $ra_{(2)}(x_{(2)}, y_{(2)}, z_{(2)})$ from Ant(2) to Ant(0) in the UWB coordinate system e; and $$\begin{bmatrix} 0 \\ -1 \\ 0 \end{bmatrix}_b$$

corresponds to a first unit baseline vector $rq_2(0, -1, 0)$ from Ant(2) to Ant(0) in the carrier antenna coordinate system b.

As shown in FIG. 12, the coordinates of the antenna Ant(2) in the carrier antenna coordinate system b are $(0, -\lambda/2, 0)$. Therefore, the first unit baseline vector $(0, -1, 0)$ from Ant(2) to Ant(0) in the carrier antenna coordinate system b may be obtained.

Formula (10) may be obtained based on Formula (9):

$$\begin{bmatrix} x_{(2)} \\ y_{(2)} \\ z_{(2)} \end{bmatrix}_e = C_b^e \times \begin{bmatrix} 0 \\ -1 \\ 0 \end{bmatrix}_b = \begin{bmatrix} \cos\phi_1\sin\varphi_1 \\ -\cos\phi_1\cos\varphi_1 \\ -\sin\phi_1 \end{bmatrix}_b \quad \text{Formula (10)}$$

Based on Formula (8) and Formula (10), the following pitch angle $\varphi_1$, azimuth $\phi_1$, and roll angle $\theta_1$ may be obtained through calculation:

$$\text{Pitch angle: } \varphi_1 = \arcsin(-z_{(2)})$$

$$\text{Azimuth: } \phi_1 = \arctan\!\left(-\frac{x_{(2)}}{y_{(2)}}\right)$$

$$\text{Roll angle: } \theta_1 = \arcsin\!\left(-\frac{z_{(1)}}{\cos\phi_1}\right)$$

In this way, the mobile phone 100 may obtain the spatial posture information of the mobile phone 100 through calculation, and the spatial posture information includes the pitch angle $\varphi_1$, the azimuth $\phi_1$, and the roll angle $\theta_1$.

Then, the mobile phone 100 may perform S1506, to implement directional control of the mobile phone 100 on a home device based on the spatial location information and the spatial posture information of the mobile phone 100. For example, as shown in FIG. 1, when the mobile phone 100 determines, based on the spatial location information and the spatial posture information of the mobile phone 100, that the mobile phone 100 points to the smart sound box, the mobile phone 100 may display a control interface 201 of the smart sound box shown in FIG. 2, so that the user controls the smart sound box.

In this embodiment of this application, the mobile phone 100 may measure a direction of arrival of a UWB signal from each UWB base station by using the multi-antenna module, and then obtain the spatial posture information of the mobile phone 100 based on the direction of arrival of each UWB signal. The direction of arrival of each UWB signal is obtained by the mobile phone 100 through real-time measurement by using the multi-antenna module. Therefore, accuracy of the direction of arrival of each UWB signal can be ensured. Therefore, an error between posture information obtained by the mobile phone 100 through calculation and actual posture information can be reduced, posture measurement accuracy of the mobile phone 100 can be improved, and then an effect of directionally controlling the home device by the mobile phone 100 can be improved.

In addition, in this solution, the spatial posture information is calculated by using the direction of arrival of a UWB signal that is received by the multi-antenna module in real time. The multi-antenna module of the mobile phone 100 may receive a UWB signal at each moment. Therefore, the spatial posture information is calculated by using this solution without depending on spatial posture information calculated at a previous moment. In addition, even if an error exists in the spatial posture information obtained through calculation, the error does not accumulate over time.

Further, in this solution, the spatial posture information of the mobile phone 100 is calculated without depending on a device like a magnetometer or a gyroscope in the mobile phone 100. Therefore, the device like the magnetometer or the gyroscope in the mobile phone 100 does not need to be calibrated, and the user does not need to operate the mobile phone 100 in a specific manner, so that the spatial posture information of the mobile phone 100 can be measured. In this way, user operations in a process of measuring posture information can be reduced.

For example, in the following embodiments, a method for obtaining spatial location information k of an antenna Ant(k) by the mobile phone 100 is described by using an example. A value of k is obtained in $\{0, 1, 2, n-1\}$, $n \geq 2$, and n is a quantity of antennas in a multi-antenna module. The spatial location information k of the antenna Ant(k) is coordinates of Ant(k) in a UWB coordinate system.

In some embodiments, the antenna Ant(k) of the mobile phone 100 may interact with Base(0), Base(1), and Base(2), and S-a, S-b, and S-c are performed to obtain the spatial location information k of the antenna Ant(k).

S-a: The UWB base stations (such as Base(0), Base(1), and Base(2)) separately broadcast a first message.

The first message is a UWB message. The UWB base station may broadcast the first message by using a UWB chip. The first message may be used to indicate the mobile phone 100 to measure the spatial location information k of the antenna Ant(k) in the UWB coordinate system constructed by the three UWB base stations. For example, Base(0), Base(1), and Base(2) shown in FIG. 10 may all broadcast the first message, and the first message is used to indicate the mobile phone 100 to measure the spatial location information k of the antenna Ant(k).

Specifically, the first message may be used to indicate the mobile phone 100 to measure a distance between a UWB base station (for example, a UWB chip of the UWB base station) that broadcasts the first message and the antenna Ant(k) that receives the first message, and then calculate the spatial location information k of the antenna Ant(k) in the UWB coordinate system based on the measured distance.

For example, the first message includes: an identifier of the UWB chip of the UWB base station that broadcasts the first message, and a first timestamp. The identifier of the UWB chip corresponds to the UWB chip, and the first timestamp indicates time at which the UWB base station broadcasts the first message.

Different UWB chips have different identifiers. Therefore, first messages broadcast by UWB chips of different UWB base stations are different. For example, it is assumed that the UWB base station Base(0) is a UWB chip $A_0$, the UWB base station Base(1) is a UWB chip $A_1$, and the UWB base station Base(2) is a UWB chip $A_2$. The identifier of the UWB chip $A_0$ carried in the first message broadcast by the UWB chip $A_0$ (namely, Base(0)) may be AH100000A. The identifier of the UWB chip $A_1$ carried in the first message broadcast by the UWB chip $A_1$ (namely, Base(1)) may be AH100000B. The identifier of the UWB chip $A_2$ carried in the first message broadcast by the UWB chip $A_2$ (namely, Base(2)) may be AH100000C, AH1000000A, AH1000B, and AH100000C are different.

S-b: The antenna Ant(k) of the mobile phone 100 receives the first message from each UWB base station (for example, Base(0), Base(1), and Base(2)), to obtain a distance between the antenna Ant(k) of the mobile phone 100 and each UWB base station.

A distance between the antenna Ant(0) of the mobile phone 100 and a UWB base station Base(j) is a distance between the mobile phone 100 and Base(j).

A UWB chip is installed in the mobile phone 100. The mobile phone 100 may receive the first message from Base(j) by using the antenna Ant(k) via the UWB chip. Then, the mobile phone 100 may obtain, through calculation, a distance between the antenna Ant(k) and Base(j) based on a UWB ranging principle and the first message received by the antenna Ant(k) from Base(j).

Specifically, the first message carries the first timestamp. The first timestamp is used to record time at which Base(j) broadcasts the first message. When receiving the first message broadcast by Base(j) at Ant(k), the mobile phone may generate a second timestamp. The second timestamp is used to record time at which Ant(k) receives the first message. Then, the mobile phone 100 can calculate, based on the time recorded in the first timestamp and the second timestamp, duration consumed for transmitting the first message from Base(j) to the mobile phone 100. Finally, the mobile phone 100 may obtain the distance between Ant(k) and Base(j) of the mobile phone 100 based on a propagation speed (for example, a speed of light) of the first message and the duration consumed for transmitting the first message from Base(j) to the mobile phone 100.

For example, refer to Table 2. Table 2 shows a distance that is between Ant(k) (for example. Ant(0)) of the mobile phone 100 and each UWB base station (for example, Base (0), Base(1), and Base(2)) in the application scenario shown in FIG. 10 and that is obtained by the mobile phone 100 through calculation.

TABLE 2

| Identifier of a UWB chip | Distance |
|---|---|
| AH100000A<br>(UWB chip $A_0$ of Base(0)) | a (length of $OK_k$ shown in FIG. 19) |
| AH100000B<br>(UWB chip $A_1$ of Base(1)) | b (length of $PK_k$ shown in FIG. 19) |
| AH100000C<br>(UWB chip $A_2$ of Base(2)) | c (length of $QK_k$ shown in FIG. 19) |

Figure 19:
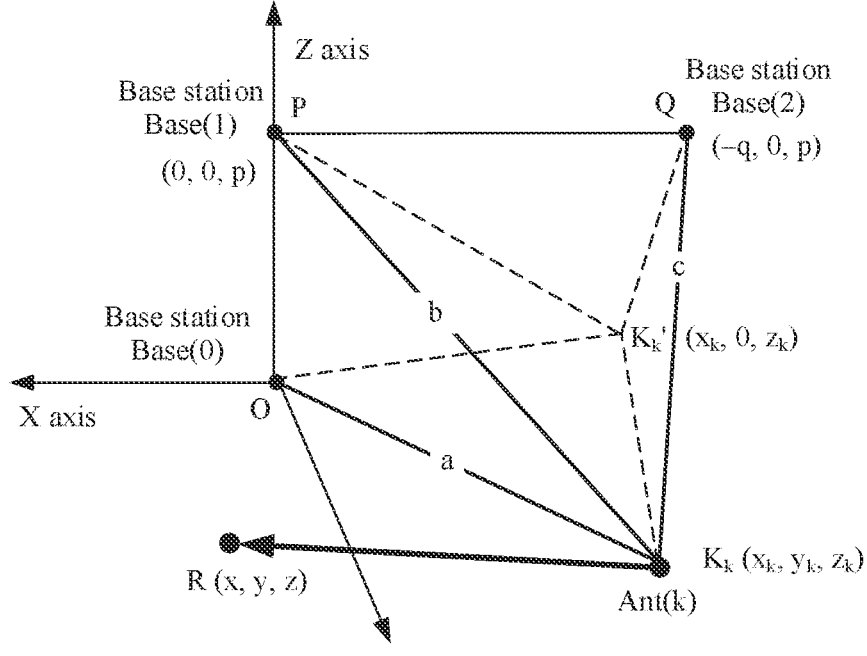
FIG. 19 is a schematic diagram of a calculation principle of a spatial location information of an electronic device according to an embodiment of this application.

A point O shown in FIG. 19 is an origin of the UWB coordinate system, and is also a location of the UWB base station Base(0) in the UWB coordinate system A point P is a location of Base(2) of the UWB base station in the UWB coordinate system. A point Q shown in FIG. 19 is a location of the UWB base station Base(1) in the UWB coordinate system. A point $K_k$ shown in FIG. 19 is a location of Ant(k) in the UWB coordinate system $OK_k=a$, $PK_k=b$, $QK_k=c$.

S-c: The mobile phone 100 calculates spatial location information k of the antenna Ant(k) in the UWB coordinate system based on the distance between the antenna Ant(k) and Base(j).

For example, in this embodiment of this application, with reference to FIG. 19, a specific method for calculating the spatial location information k of Ant(k) in the UWB coordinate system by the mobile phone 100 is described. As shown in FIG. 19, it is assumed that coordinates of Ant(k) of the mobile phone 100 in the UWB coordinate system are $K_k(x_k, y_k, z_k)$. Coordinates of the point O, the point P, and the point Q in the UWB coordinate system are respectively O(0, 0, 0), P(0, 0, p), and Q(-q, 0, p). PQ=q, where q is a length of a display of a smart television. OP=p, where p is a width (also referred to as a height) of the display of the smart television. In some embodiments, the first message may further include coordinates of a UWB base station in the UWB coordinate system. For example, the first message broadcast by Base(0) further includes coordinates O(0, 0, 0); the first message broadcast by Base(1) further includes coordinates P(0, 0, p); and the first message broadcast by Base(2) further includes coordinates Q(−q, 0, p).

A point $K_k'$ shown in FIG. 19 is perpendicular projection of a point $K_k$ on an OPQ plane (namely, an XOZ plane), and coordinates of $K_k'$ is $(x_k, 0, \&)$. Therefore, $K_kK_k'$ is perpendicular to the OPQ plane (namely, the XOZ plane), $K_kK_k'$ is perpendicular to $PK_k'$, $K_kK_k'$ is perpendicular to $QK_k'$, and $K_kK_k'$ is perpendicular to $OK_k'$. In this way, Formula (11) to Formula (13) may be obtained according to the Pythagorean theorem:

$$K_kK_k'^2 + QK_k'^2 = QK_k^2 \qquad \text{Formula (11)}$$

$$K_kK_k'^2 + PK_k'^2 = PK_k^2 \qquad \text{Formula (12)}$$

$$K_kK_k'^2 + OK_k'^2 = OK_k^2 \qquad \text{Formula (13)}$$

$K_kK_k'=y_k$, $QK_k=c$, $QK_k'=\sqrt{(-q-x_k)^2+(p-z_k)^2}$, and Formula (14) may be obtained based on Formula (11). $PK_k=b$, $PK_k'=\sqrt{x_k^2+(p-z_k)^2}$, and Formula (15) may be obtained based on Formula (12). $OK_k=a$. $OK_k'=\sqrt{x_k^2+z_k^2}$ and Formula (16) may be obtained based on Formula (13).

$$y_k^2 + c^2 = (-q - x_k)^2 + (p - z_k)^2 \qquad \text{Formula (14)}$$

$$y_k^2 + b^2 = x_k^2 + (p - z_k)^2 \qquad \text{Formula (15)}$$

$$y_k^2 + a^2 = x_k^2 + z_k^2 \qquad \text{Formula (16)}$$

Then, the mobile phone 100 may obtain, through calculation based on Formula (14), Formula (15), and Formula (16), the spatial location information k of Ant(k), namely, coordinates $K_k(x_k, y_k, z_k)$ of Ant(k) in the UWB coordinate system. A specific method for and a calculation result of calculating $x_k$, $y_k$, and $z_k$ by the mobile phone 100 based on Formula (14), Formula (15), and Formula (16) are not described in this embodiment of this application.

In some other embodiments, the mobile phone 100 may actively send a ranging request to a UWB base station by using Ant(k), to measure a distance between Ant(k) and the UWB base station. Specifically, the mobile phone 100 may interact with Base(0), Base(1), and Base(2) by using Ant(k), to perform S-A, S-B, S-C, and S-D to obtain spatial location information k of Ant(k). A value of k is sequentially obtained in {0, 1, 2, . . . , n−1}, n≥2, and n is a quantity of antennas in a multi-antenna module.

S-A: The mobile phone 100 sends the ranging request to the UWB base station (for example, Base(0), Base(1), or Base(2)) by using Ant(k).

The ranging request is used to request to measure a distance between Ant(k) of the mobile phone 100 and the UWB base station. The ranging request may further include an identifier of a UWB chip of the mobile phone 100, and may further include an identifier of Ant(k). For example, the mobile phone 100 may broadcast the ranging request. In this way, each UWB base station (for example, Base(0), Base(1), or Base(2)) may receive the ranging request.

S-B: After receiving the ranging request, the UWB base station (for example. Base(0), Base(1), or Base(2)) sends a ranging response to the mobile phone 100.

In some embodiments, the UWB base station may broadcast the ranging response. The ranging response includes an identifier of a UWB chip of the UWB base station that sends the ranging response, and may further include the identifier of Ant(k). The ranging response may further include a first time stamp, and the first time stamp is used to indicate time at which the UWB base station (for example, Base(0)) sends the ranging response.

S-C: The mobile phone 100 receives the ranging response from each UWB base station (for example, Base(0), Base(1), and Base(2)) by using Ant(k), to obtain a distance between Ant(k) and each UWB base station.

S-D: The mobile phone 100 calculates the spatial location information k of Ant(k) based on the distance between Ant(k) and each UWB base station.

For detailed descriptions of S-C and S-D, refer to the descriptions of S-a, S-b, and S-c in the foregoing embodiments. Details are not described in this embodiment of this application.

It should be noted that a specific method for obtaining the spatial location information of Ant(k) by the mobile phone 100 includes but is not limited to the method in the foregoing embodiment. Any method for obtaining the spatial location information of Ant(k) in the UWB coordinate system is applicable to the method in this embodiment of this application.

In the following embodiments, an effect of the embodiments of this application is described through simulation. Specifically, three UWB base stations (such as Base0, Base1, and Base2) may be deployed in simulation space to construct a UWB positioning system (namely, a system coordinate system). A ranging error between a carrier (like the mobile phone 100) and a UWB base station is set to 0.05 m (m). An error of a direction of arrival that is of a UWB signal and that is measured by the carrier (like the mobile phone 100) is set to ±3°. In addition, initial errors of three axes of a posture are set as follows: a pitch angle of 1°, a roll angle of −1°, and an azimuth of 3°. A three-axis fixed offset of a gyroscope is 0.5 degree/s (deg/s), and noise of the gyroscope is 0.006 deg/sqrt(s), where deg/sqrt(s) is a degree/ quadratic second, or deg/sqrt(s) is a degree/second squared.

Figure 20:
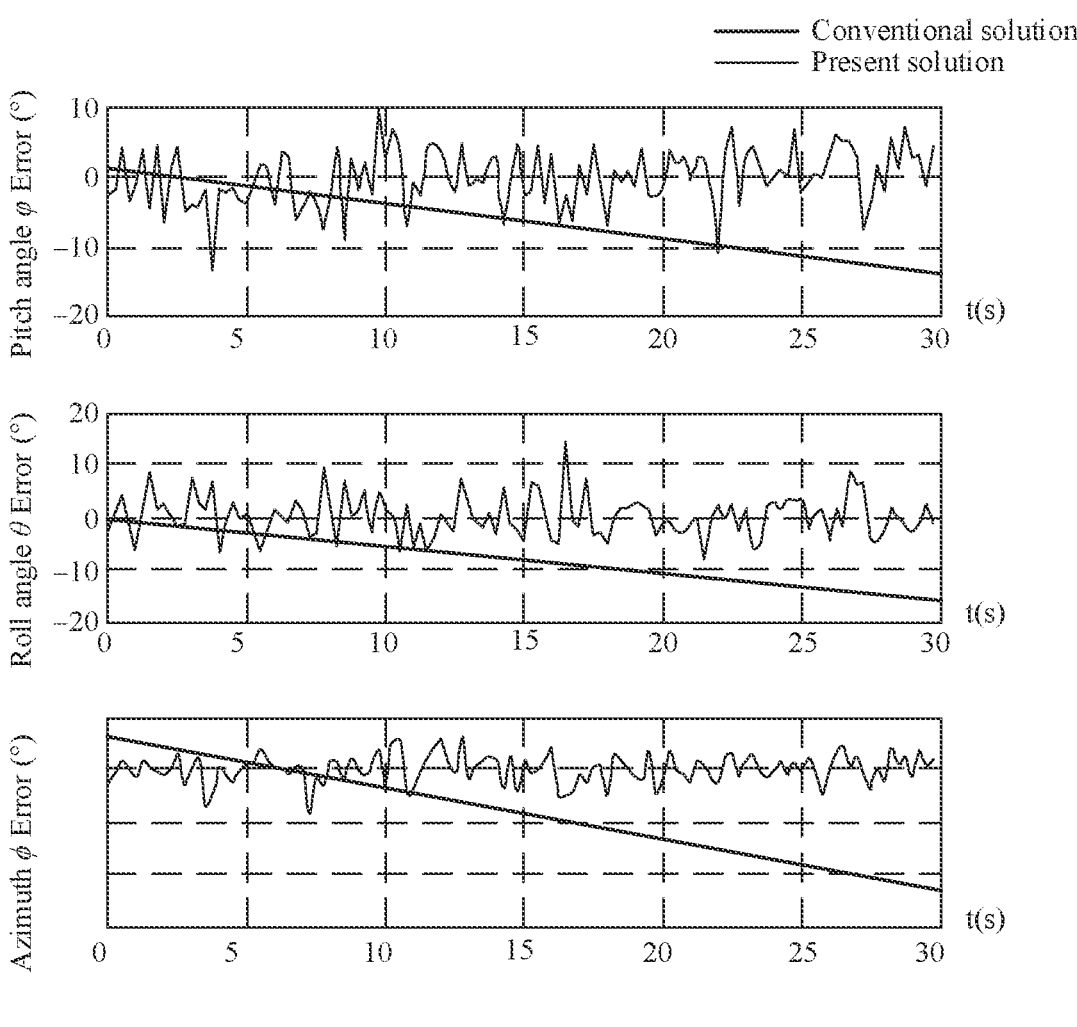
FIG. 20 is a schematic diagram of a simulation result according to an embodiment of this application.

It is assumed that simulation duration is 30 seconds (s), and the carrier (for example, the mobile phone 100) performs a plurality of motion states such as a straight line motion and a left/right rotation in the simulation space. FIG. 20 is a schematic diagram of errors of a pitch angle, a roll angle, and an azimuth that are calculated by a carrier (for example, a mobile phone 100) in a simulation process by performing this solution.

It can be learned from FIG. 20 that if spatial posture information (including the pitch angle $\varphi$, the azimuth $\phi$, and the roll angle $\theta$) of the carrier (for example, the mobile phone 100) is measured by using this solution, a posture measurement error is less than a posture measurement error in a conventional solution. In addition, the posture measurement error in the conventional solution increases over time, but the posture measurement error in this solution does not increase over time. In other words, the posture measurement error in this solution does not accumulate over time.

Some other embodiments of this application provide an electronic device. The electronic device may include the touchscreen, a memory, and one or more processors. The touchscreen and the memory are coupled to the processor. The memory is configured to store computer program code.

The computer program code includes computer instructions. When the processor executes the computer instructions, the electronic device may perform the functions or the steps performed by the mobile phone in the foregoing method embodiments. For a structure of the electronic device, refer to the structure of the electronic device 100 shown in FIG. 9.

Other embodiments of this application provide a display apparatus. The apparatus may be applied to an electronic device including the touchscreen. The apparatus is configured to perform the functions or the steps performed by the mobile phone in the foregoing method embodiments.

Figure 21:
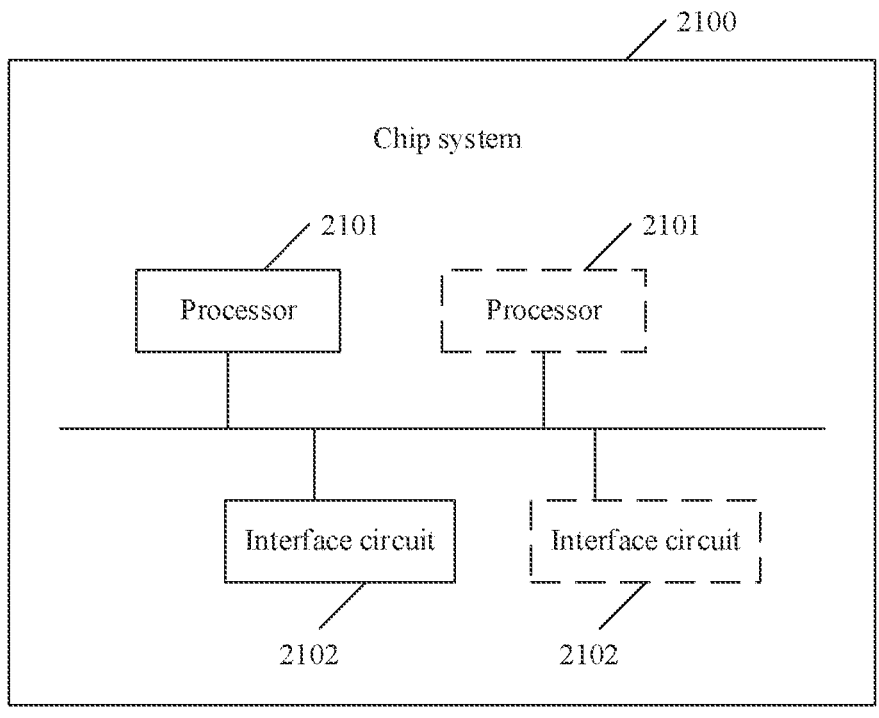
FIG. 21 is a schematic diagram of a structure of a chip system according to an embodiment of this application.

An embodiment of this application further provides a chip system. As shown in FIG. 21, the chip system includes at least one processor 2101 and at least one interface circuit 2102. The processor 2101 and the interface circuit 2102 may be interconnected by using a line. For example, the interface circuit 2102 may be configured to receive a signal from another apparatus (for example, a memory of an electronic device). For another example, the interface circuit 2102 may be configured to send a signal to another apparatus (for example, the processor 2101). For example, the interface circuit 2102 may read instructions stored in a memory, and send the instructions to the processor 2101. When the instructions are executed by the processor 2101, the electronic device is enabled to perform the steps in the foregoing embodiments. Certainly, the chip system may further include another discrete device. This is not specifically limited in this embodiment of this application.

An embodiment of this application further provides a computer storage medium. The computer storage medium includes computer instructions. When the computer instructions are run on the foregoing electronic device, the electronic device is enabled to perform the functions or the steps performed by the mobile phone in the foregoing method embodiments.

An embodiment of this application further provides a computer program product. When the computer program product runs on a computer, the computer is enabled to perform the functions or the steps performed by the mobile phone in the foregoing method embodiments.

The foregoing descriptions about implementations allow a person skilled in the art to clearly understand that, for the purpose of convenient and brief description, division of the foregoing functional modules is used as an example for illustration. During actual application, the foregoing functions can be allocated to different modules and implemented based on a requirement, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiments are merely examples. For example, the module or division into the units is merely logical function division and may be other division during actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of embodiments.

In addition, each functional unit in embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium Based on such an understanding, the technical solutions of embodiments of this application essentially, or the part contributing to the conventional technology, or all or some of the technical solutions may be implemented in the form of a software product. The software product is stored in a storage medium and includes several instructions for instructing a device (which may be a single-chip microcomputer, a chip or the like) or a processor (processor) to perform all or some of the steps of the methods described in embodiments of this application. The foregoing storage medium includes any medium that can store program code, for example, a USB flash drive, a removable hard disk, a read-only memory (read-only memory. ROM), a random access memory (random access memory, RAM), a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method applied to an electronic device comprising an ultra-wideband (UWB) chip and n antennas, wherein the method comprises:
   receiving UWB signals from m UWB base stations using the n antennas of the electronic device, wherein n≥3, wherein n is an integer, wherein m≥3, and wherein m is an integer; and
   determining spatial posture information of the electronic device based on the UWB signals,
   wherein the spatial posture information comprises a pitch angle $\varphi$, an azimuth $\phi$, and a roll angle $\theta$ of a carrier antenna coordinate system relative to a UWB coordinate system, wherein the UWB coordinate system is based on the m UWB base stations, and wherein the carrier antenna coordinate system is based on the n antennas.

2. The method of claim 1, wherein the UWB signals are received from the m UWB base stations, in response to the electronic device being powered on, starting a smart home application, or starting a preset function, wherein at least one of a notification bar of the electronic device, a setting interface of the electronic device, or a setting interface of the smart home application comprises an on/off option of the preset function, and wherein the on/off option enables or disables the preset function.

3. The method of claim 1, further comprising:
   determining spatial location information of the electronic device based on the UWB signals, wherein the spatial location information comprises coordinate information of the electronic device in the UWB coordinate system;

determining directional control information of the electronic device based on the spatial location information and the spatial posture information, wherein the directional control information indicates a pointing direction of the electronic device; and controlling, based on the directional control information and coordinate information of each home device in the UWB coordinate system, a home device to which the electronic device points.

4. The method of claim 1, wherein a coordinate origin of the carrier antenna coordinate system coincides with a location of an antenna 0 in the n antennas, wherein an antenna i in the n antennas is located on a coordinate axis of the carrier antenna coordinate system, wherein a distance between the antenna i and the antenna 0 is less than or equal to $\lambda$, wherein $\lambda$ is a wavelength of a UWB signal, wherein a value of i is sequentially obtained in $\{1, 2, \ldots, n-1\}$, and wherein the distance between the antenna i and the antenna 0 is equal to $\lambda/2$.

5. The method of claim 1, wherein the n antennas comprise at least an antenna 0, an antenna 1, and an antenna 2, wherein an x axis of the carrier antenna coordinate system is parallel to a connection line between the antenna 1 and the antenna 0 and points to a direction from the antenna 1 to the antenna 0, wherein a y axis of the carrier antenna coordinate system is parallel to a connection line between the antenna 2 and the antenna 0 and points to a direction from the antenna 2 to the antenna 0, and wherein a z axis of the carrier antenna coordinate system is perpendicular to the x axis and the y axis and forms a right-hand rectangular coordinate system with the x axis and the y axis.

6. The method of claim 1, wherein receiving the UWB signals from the m UWB base stations based on the n antennas comprises:

determining an angle of arrival $\alpha_{(i, j)}$ of a UWB signal from a UWB base station j in the m UWB base stations relative to an antenna i, wherein a value of j is sequentially obtained in $\{0, 1, 2, \ldots, m-1\}$, and wherein the angle of arrival $\alpha_{(i, j)}$ is an included angle between a vector from the antenna i to the UWB base station j and a vector from the antenna i to an antenna 0 in the UWB coordinate system, wherein a coordinate origin of the carrier antenna coordinate system coincides with a location of the antenna 0 in the n antennas; and determining the spatial posture information of the electronic device based on a plurality of angles of arrival, the UWB signals, and coordinates of the n antennas in the carrier antenna coordinate system, wherein the plurality of angles of arrival comprise the angle of arrival $\alpha_{(i, j)}$ obtained when a value of i is sequentially obtained in $\{1, 2, \ldots, n-1\}$ and a value of j is sequentially obtained in $\{0, 1, 2, \ldots, m-1\}$.

7. The method of claim 6, wherein determining the angle of arrival $\alpha_{(i, j)}$ of the UWB signal from the UWB base station j in the m UWB base stations relative to the antenna i comprises:

obtaining a phase difference between UWB signals received from the UWB base station j by using the antenna i and the antenna 0, wherein the phase difference indicates a distance difference between a distance between the antenna i and the UWB base station j and a distance between the antenna 0 and the UWB base station j; and calculating the angle of arrival $\alpha_{(i, j)}$ by using the law of cosines based on the distance difference indicated by the phase difference and the distance between the antenna i and the antenna 0.

8. The method of claim 6, wherein determining the spatial posture information of the electronic device based on the plurality of angles of arrival, the UWB signals, and coordinates of the n antennas in the carrier antenna coordinate system comprises:

obtaining a baseline vector $r_{(i, j)}$ based on the UWB signal received from the UWB base station j by using the antenna i, wherein the baseline vector $r_{(i, j)}$ is a direction vector from the antenna i to the UWB base station j in the UWB coordinate system;

obtaining a first unit baseline vector $rq_i$ based on coordinates of the antenna i in the carrier antenna coordinate system, wherein the first unit baseline vector $rq_i$ is a unit direction vector from the antenna i to the antenna 0 in the carrier antenna coordinate system; and determining the spatial posture information of the electronic device based on the plurality of angles of arrival, a plurality of baseline vectors, and a plurality of first unit baseline vectors, wherein the plurality of baseline vectors comprise the baseline vector $r_{(i, j)}$ obtained when a value of i is sequentially obtained in $\{1, 2, \ldots, n-1\}$ and a value of j is sequentially obtained in $\{0, 1, 2, \ldots, m-1\}$, and wherein the plurality of first unit baseline vectors comprise the first unit baseline vector $rq_i$ obtained when a value of i is sequentially obtained in $\{1, 2, \ldots, n-1\}$ and a value of j is sequentially obtained in $\{0, 1, 2, \ldots, m-1\}$.

9. The method of claim 8, wherein determining the spatial posture information of the electronic device based on the plurality of angles of arrival, the plurality of baseline vectors, and the plurality of first unit baseline vectors comprises:

determining a plurality of second unit baseline vectors based on the plurality of angles of arrival and the plurality of baseline vectors, wherein the plurality of second unit baseline vectors comprise a second unit baseline vector $ra_{(i)}$ obtained when a value of i is sequentially obtained in $\{1, 2, \ldots, n-1\}$ and a value of j is sequentially obtained in $\{0, 1, 2, \ldots, m-1\}$, and wherein the second unit baseline vector $ra_{(i)}$ is a unit direction vector from the antenna i to the antenna 0 in the UWB coordinate system; and determining the spatial posture information of the electronic device based on the plurality of first unit baseline vectors and the plurality of second unit baseline vectors.

10. The method of claim 9, wherein determining the spatial posture information of the electronic device based on the plurality of first unit baseline vectors and the plurality of second unit baseline vectors comprises determining the spatial posture information of the electronic device based on the plurality of first unit baseline vectors and the plurality of second unit baseline vectors by using a preset rotation matrix, wherein the preset rotation matrix is a rotation matrix obtained when the electronic device transforms from a spatial posture corresponding to the pitch angle $\varphi$, the azimuth $\phi$, and the roll angle $\theta$ to a preset initial posture, wherein the preset initial posture is a posture of the electronic device that exists when three axes of the carrier antenna coordinate system are respectively parallel to three axes of the UWB coordinate system, wherein the preset rotation matrix is used to convert a coordinate parameter in the carrier antenna coordinate system into a coordinate parameter in the UWB coordinate system, and wherein the coordinate parameter comprises a vector.

11. An electronic device comprising:

an ultra-wideband (UWB) chip;

n antennas electrically connected to the UWB chip and configured to form a carrier antenna coordinate system, wherein a coordinate origin of the carrier antenna coordinate system coincides with a location of an antenna 0 in the n antennas, wherein an antenna i in the n antennas is located on a coordinate axis of the carrier antenna coordinate system, wherein a distance between the antenna i and the antenna 0 is less than or equal to $\lambda$, wherein $\lambda$ is a wavelength of a UWB signal, wherein a value of i is sequentially obtained in $\{1, 2, \ldots, n-1\}$, wherein $n \geq 3$, and wherein n is an integer;

a memory configured to store instructions; and one or more processors coupled to the UWB chip, the n antennas, and the memory, wherein the one or more processors are configured to execute the instructions to cause the electronic device to:

receive, using the n antennas, UWB signals comprising a UWB signal from a UWB base station j in m UWB base stations, wherein a value of j is sequentially obtained in $\{0, 1, 2, \ldots, m-1\}$, wherein a UWB coordinate system is based on the m UWB base stations, wherein $m \geq 3$, and wherein m is an integer; and determine spatial posture information of the electronic device based on the UWB signals, wherein the spatial posture information of the electronic device comprises: a pitch angle $\varphi$, an azimuth $\phi$, and a roll angle $\theta$ of the carrier antenna coordinate system relative to the UWB coordinate system.

12. The electronic device of claim 11, wherein the UWB signals are received in response to the electronic device being powered on, starting a smart home application, or starting a preset function, wherein at least one of a notification bar of the electronic device, a setting interface of the electronic device, or a setting interface of the smart home application comprises an on/off option of the preset function, wherein the on/off option is used to enable or disable the preset function.

13. The electronic device of claim 11, wherein the one or more processors are further configured to execute the instructions to cause the electronic device to:

determine spatial location information of the electronic device based on the UWB signals received from the m UWB base stations by using the n antennas, wherein the spatial location information comprises coordinate information of the electronic device in the UWB coordinate system;

determine directional control information of the electronic device based on the spatial location information and the spatial posture information, wherein the directional control information indicates a pointing direction of the electronic device; and control, based on the directional control information and coordinate information of each home device in the UWB coordinate system, a home device to which the electronic device points.

14. The electronic device of claim 11, wherein the distance between the antenna i and the antenna 0 is equal to $\lambda/2$.

15. The electronic device of claim 11, wherein the n antennas comprise the antenna 0, an antenna 1, and an antenna 2, wherein an x axis of the carrier antenna coordinate system is parallel to a connection line between the antenna 1 and the antenna 0 and points to a direction from the antenna 1 to the antenna 0, wherein a y axis of the carrier antenna coordinate system is parallel to a connection line between the antenna 2 and the antenna 0 and points to a direction from the antenna 2 to the antenna 0, and wherein a z axis of the carrier antenna coordinate system is perpendicular to the x axis and the y axis and forms a right-hand rectangular coordinate system with the x axis and the y axis.

16. The electronic device of claim 15, wherein the one or more processors are further configured to execute the instructions to cause the electronic device to:

determine an angle of arrival $\alpha_{(i, j)}$ of the UWB signal from the UWB base station j in the m UWB base stations relative to the antenna i, wherein a value of j is sequentially obtained in $\{0, 1, 2, \ldots, m-1\}$, and wherein the angle of arrival $\alpha_{(i, j)}$ is an included angle between a vector from the antenna i to the UWB base station j and a vector from the antenna i to the antenna 0 in the UWB coordinate system; and determine the spatial posture information of the electronic device based on a plurality of angles of arrival, the UWB signals, and coordinates of the n antennas in the carrier antenna coordinate system, wherein the plurality of angles of arrival comprise $\alpha_{(i, j)}$ obtained when a value of i is sequentially obtained in $\{1, 2, \ldots, n-1\}$ and a value of j is sequentially obtained in $\{0, 1, 2, \ldots, m-1\}$.

17. The electronic device of claim 15, wherein the one or more processors are further configured to execute the instructions to cause the electronic device to:

obtain a phase difference between UWB signals received from the UWB base station j by using the antenna i and the antenna 0, wherein the phase difference indicates a distance difference between a distance between the antenna i and the UWB base station j and a distance between the antenna 0 and the UWB base station j; and calculate, by the electronic device, the angle of arrival $\alpha_{(i, j)}$ by using the law of cosines based on the distance difference indicated by the phase difference and the distance between the antenna i and the antenna 0.

18. The electronic device of claim 17, wherein the one or more processors are further configured to execute the instructions to cause the electronic device to:

obtain a baseline vector $r_{(i, j)}$ based on a UWB signal received from the UWB base station j by using the antenna i, wherein the baseline vector $r_{(i, j)}$ is a direction vector from the antenna i to the UWB base station j in the UWB coordinate system;

obtain a first unit baseline vector $rq_i$ based on coordinates of the antenna i in the carrier antenna coordinate system, wherein the first unit baseline vector $rq_i$ is a unit direction vector from the antenna i to the antenna 0 in the carrier antenna coordinate system; and determine the spatial posture information of the electronic device based on a plurality of angles of arrival, a plurality of baseline vectors, and a plurality of first unit baseline vectors, wherein the plurality of baseline vectors comprises the baseline vector $r_{(i, j)}$ obtained when a value of i is sequentially obtained in $\{1, 2, \ldots, n-1\}$ and a value of j is sequentially obtained in $\{0, 1, 2, \ldots, m-1\}$, and wherein the plurality of first unit baseline vectors comprises the first unit baseline vector $rq_i$ obtained when a value of i is sequentially obtained in $\{1, 2, \ldots, n-1\}$ and a value of j is sequentially obtained in $\{0, 1, 2, \ldots, m-1\}$.

19. The electronic device of claim 18, wherein the one or more processors are further configured to execute the instructions to cause the electronic device to:

determine a plurality of second unit baseline vectors based on the plurality of angles of arrival and the plurality of baseline vectors, wherein the plurality of second unit baseline vectors comprise a second unit baseline vector $ra_{(i)}$ obtained when a value of i is sequentially obtained in $\{1, 2, \ldots, n-1\}$ and a value of j is sequentially obtained in $\{0, 1, 2, \ldots, m-1\}$, and wherein the second unit baseline vector $ra_{(i)}$ is a unit direction vector from the antenna i to the antenna 0 in the UWB coordinate system; and determine the spatial posture information of the electronic device based on the plurality of first unit baseline vectors and the plurality of second unit baseline vectors.

20. The electronic device of claim 19, wherein the one or more processors are further configured to execute the instructions to cause the electronic device to determine the spatial posture information of the electronic device based on the plurality of first unit baseline vectors and the plurality of second unit baseline vectors by using a preset rotation matrix, wherein the preset rotation matrix is a rotation matrix obtained when the electronic device transforms from a spatial posture corresponding to the pitch angle $\varphi$, the azimuth $\phi$, and the roll angle $\theta$ to a preset initial posture, wherein the preset initial posture is a posture of the electronic device that exists when three axes of the carrier antenna coordinate system are respectively parallel to three axes of the UWB coordinate system, wherein the preset rotation matrix is used to convert a coordinate parameter in the carrier antenna coordinate system into a coordinate parameter in the UWB coordinate system, and wherein the coordinate parameter comprises a vector.

\* \* \* \* \*